US011474995B2

United States Patent
Avni et al.

(10) Patent No.: US 11,474,995 B2
(45) Date of Patent: Oct. 18, 2022

(54) UPDATING METADATA IN HARDWARE TRANSACTIONAL MEMORY USER ABORTS

(71) Applicant: Huawei Technologies Co., Ltd., Shenzhen (CN)

(72) Inventors: Hillel Avni, Hod Hasharon (IL); Aharon Avitzur, Hod Hasharon (IL)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 363 days.

(21) Appl. No.: 16/657,629

(22) Filed: Oct. 18, 2019

(65) Prior Publication Data
US 2020/0081883 A1  Mar. 12, 2020

Related U.S. Application Data

(63) Continuation of application No. PCT/EP2017/059236, filed on Apr. 19, 2017.

(51) Int. Cl.
*G06F 16/23* (2019.01)
*G06F 9/46* (2006.01)

(52) U.S. Cl.
CPC .......... *G06F 16/2379* (2019.01); *G06F 9/467* (2013.01)

(58) Field of Classification Search
CPC ................ G06F 16/2379; G06F 9/467
See application file for complete search history.

(56) References Cited

U.S. PATENT DOCUMENTS

| 8,433,878 B1* | 4/2013 | Kotecha ............. H04L 12/6418 711/173 |
| 2007/0028056 A1 | 2/2007 | Harris |
| 2007/0239943 A1* | 10/2007 | Dice .................... G06F 9/466 711/147 |
| 2008/0319997 A1 | 12/2008 | Duffy et al. |

(Continued)

FOREIGN PATENT DOCUMENTS

| CN | 101814018 A | 8/2010 |
| CN | 106030534 A | 10/2016 |

OTHER PUBLICATIONS

Ramadan et al., Dependence-Aware Transactional Memory for Increased Concurrency, IEEE, 2014 (Year: 2014).*

(Continued)

*Primary Examiner* — Tamara T Kyle
*Assistant Examiner* — Lahcen Ennaji
(74) *Attorney, Agent, or Firm* — Conely Rose, P.C.

(57) ABSTRACT

A system for managing abort events of Hardware Transactional Memory (HTM) transactions to an in-memory database, comprising a processor adapted to control a plurality of abort events of a plurality of database transactions held concurrently to a shared in-memory database and a method for managing abort events comprising analyzing a metadata record associated with each potential abort event, where the metadata record comprises a row ID value and a row version value of a certain one of a plurality of rows of a database that is concurrently accessed by an aborting HTM transaction and another HTM transaction, comparing the row ID value and the row version value to a local ID value and a local version value of the aborting HTM transaction and determining a contention condition between the aborting HTM transaction and the other HTM transaction.

20 Claims, 13 Drawing Sheets

(56) References Cited

U.S. PATENT DOCUMENTS

| | | | |
|---|---|---|---|
| 2010/0162249 A1* | 6/2010 | Shpeisman | G06F 9/466 718/101 |
| 2010/0169579 A1 | 7/2010 | Sheaffer et al. | |
| 2010/0228927 A1* | 9/2010 | Levanoni | G06F 9/467 711/154 |
| 2010/0332538 A1* | 12/2010 | Gray | G06F 16/2379 707/774 |
| 2011/0246725 A1 | 10/2011 | Moir et al. | |
| 2012/0311273 A1* | 12/2012 | Marathe | G06F 9/467 711/151 |
| 2013/0339327 A1* | 12/2013 | Belmar | G06F 13/24 707/703 |
| 2014/0281267 A1 | 9/2014 | McKenney | |
| 2015/0242276 A1 | 8/2015 | Cain, III et al. | |
| 2015/0242298 A1 | 8/2015 | Cain, III et al. | |
| 2016/0357791 A1* | 12/2016 | Levandoski | G06F 12/1009 |
| 2017/0052726 A1* | 2/2017 | Nakaike | G06F 3/0683 |

OTHER PUBLICATIONS

Gil et al. "Eager Beats Lazy: Improving Store Management in Eager Hardware Transaction Memory", IEEE, 2013 (Year: 2013).*

Rominhas et al. "Enhancing Efficiency of Hybrid Transactional Memory via Dynamic Data Portioning Schemes", ACM, 2018 (Year: 2018).*

Leis et al., Exploiting Hardware Transactional Memory in Main-Memory Databases talks about splitting transactions and controlling aborts, IEEE, 2014 (Year: 2014).*

Mohamedin et al. "Managing Resource Limitation of Best-Effort HTM", IEEE, 2017 (Year: 2017).*

Zhou et al. "Practical Experience with Transactional Lock Elision", IEEE, 2017. (Year: 2017).*

Leis et al. "Scaling HTM-Supported Database Transactions to Many Cores", IEEE, 2016. (Year: 2016).*

Chen, Y., et al., "Fast and General Distributed Transactions using RDMA and HTM," Eurosys 2016: Article No. 26, Apr. 18-21, 2016, 17 pages.

Leis, V., et al., "Scaling HTM-Supported Database Transactions to Many Cores," IEEE Transactions on Knowledge and Data Engineering, vol. 28, No. 2, Feb. 2016, pp. 297-310.

Yu, X., et al., "TicToc: Time Traveling Optimistic Concurrency Control," SIGMOD Conference, Jun. 26-Jul. 1, 2016, pp. 1629-1642.

Shasha, D., et al., "Transaction Chopping: Algorithms and Performance Studies," ACM Transactions on Database Systems, vol. 20, No. 3, Sep. 1995, pp. 325-363.

Leis, V., et al., "Exploiting Hardware Transactional Memory in Main-Memory Databases," XP032595854, IEEE 30th International Conference on Data Engineering, Mar. 31, 2014, p. 580-591.

Wang, Z., et al., "Using Restricted Transactional Memory to Build a Scalable In-Memory Database," XP058048182, Computer Systems ACM, Apr. 13-16, 2014, 15 pages.

Foreign Communication From A Counterpart Application, PCT Application No. PCT/EP2017/059236, English Translation of International Search Report dated Oct. 24, 2017, 6 pages.

Foreign Communication From A Counterpart Application, PCT Application No. PCT/EP2017/059236, English Translation of Written Opinion dated Oct. 24, 2017, 8 pages.

Hillel Avni et al, "Hardware Transactions in Nonvolatile Memory," HAL, Oct. 2015, 17 pages.

Min Yoon et al., "Conflict Prediction-Based Transaction Execution for Transactional Memory in Multi-core In-memory Databases," 2016 IEEE International Conference on Cluster Computing (CLUSTER), Dec. 2016, 2 pages.

Wang Zhaoguo, Improving the Scalability of In-Memory Computing Systems Using Transactional Memory, Fudan University, 2016, Issue 01, 188 pages(with English translation of related part and abstract).

* cited by examiner

UPDATING METADATA IN HARDWARE TRANSACTIONAL MEMORY USER ABORTS

CROSS-REFERENCE TO RELATED APPLICATIONS

This application is a continuation application of International Application No. PCT/EP2017/059236, filed on Apr. 19, 2017, the disclosure of which is hereby incorporated by reference in its entirety.

BACKGROUND

The present disclosure, in some embodiments thereof, relates to managing abort events of database transactions to an in-memory database and, more particularly, but not exclusively, to managing abort events of database transaction to an in-memory database which are split to a plurality of Hardware Transactional Memory (HTM) transactions.

Computing power is constantly increasing and evolving, in particular, through multi-processing utilized through a plurality of threads running on one or more cores of one or more processors allowing concurrent execution of a plurality of processes.

Similarly, storage technologies and architectures are also constantly advancing, in particular, system memory utilized through high-density (capacity) and high-speed Dynamic Random Access memory (DRAM).

The ever evolving high-density high-speed memory methodologies allow for storing increased volumes of data in the volatile DRAM to support accelerated access and reduced latency thus allowing for increased performance. One example for such an implementation may be an in-memory database where a database and/or a part thereof may be stored in the system memory utilized by the DRAM. Accessing the database may be further accelerated by initiating a plurality of concurrent accesses (database transactions) to the in-memory database through a plurality of concurrent processes executed by the plurality of threads.

SUMMARY

According to a first aspect of the present disclosure there is provided a system for managing abort events of HTM transactions to an in-memory database, comprising a processor adapted to control a plurality of abort evens of a plurality of database transactions held concurrently to a shared in-memory database, wherein each of the plurality of database transactions is split to a plurality of HTM transactions executed atomically to access one of a plurality of rows of a database, by:

Analyzing a metadata record associated with each of a plurality of potential abort events, the metadata record comprising a row identification (ID) value and a row version value of a certain one of the plurality of rows which is concurrently accessed by one or more aborting HTM transactions and one or more other HTM transactions.

Comparing the row ID value and the row version value to a local ID value and a local version value of the aborting HTM transaction.

Determining a contention condition between the one or more aborting HTM transactions and one or more other HTM transactions.

Identifying conflicts and potential contention conditions between concurrent HTM transactions is done according to an identification signaling system in which each thread is uniquely identified with a unique ID value and a self-incrementing version value. This allows each thread initiating a database transaction to efficiently identify whether other concurrent write transactions are in progress to the same database row(s) and thus identify potential conflict (contention) between concurrent HTM transactions in which an abort may be required. Moreover, this allows each thread to locally maintain its version with respect to the versions of the rows of the in-memory database. Only in case of a potential conflict between concurrent HTM transactions, the respective thread may synchronizes its local values with global values stored in a central location (resource) shared by all threads. This may prevent a bottleneck that may be caused by the plurality of threads accessing concurrently and frequently the global values central location.

According to a second aspect of the present disclosure there is provided a method of managing abort events of HTM transactions to an in-memory database, comprising:

Monitoring a plurality of potential abort evens of a plurality of database transactions held concurrently to a shared in-memory database, wherein each of the plurality of database transactions is split to a plurality of HTM transactions executed atomically to access one of a plurality of rows of a database.

Analyzing a metadata record associated with each of the plurality of potential abort events, the metadata record comprising a row ID value and a row version value of a certain one of the plurality of rows which is concurrently accessed by one or more aborting HTM transactions and one or more other HTM transactions.

Comparing the row ID value and the row version value to a local ID value and a local version value of the aborting HTM transaction.

Determining a contention condition between the one or more aborting HTM transactions and one or more other HTM transactions.

In a further implementation form of the first and/or second aspects, a size of each of the plurality of HTM transactions is adapted to fit in a single cache line of the processor. This may allow overcoming the processor cache line capacity restriction and may significantly reduce the number of database transaction abort events since violating the cache size capacity restriction is a major contributor to the abort events of the database transactions. Moreover, this allows taking advantage of processor's inherent hardware cache coherency mechanism which may be highly efficient thus significantly increasing performance of the database transactions and the overall database access performance.

In a further implementation form of the first and/or second aspects, the metadata record comprises a type of the HTM transactions. The type is a member of a group consisting of: a read HTM transaction and a write HTM transaction. This allows the threads to identify the type of the HTM transaction that is concurrently accessing the same row of the database in order to determine whether the concurrent HTM transaction may be conflicting.

In a further implementation form of the first and/or second aspects, the local ID value uniquely identifies each of a plurality of threads initiating concurrently the plurality of database transactions comprising the HTM transaction and the local version value is a self-incrementing value which is incremented by the each thread following each successful commit of one of the plurality of database transactions. The row ID value is the ID value of a respective one of the plurality of threads that made a most recent successful commit to the certain row and the row version value is the version value of the respective thread at time of the most recent successful commit. This identification signaling mechanism may allow efficiently identifying potential conflicts between the concurrent HTM transactions.

In a further implementation form of the first and/or second aspects, the local ID value and the local version value are local copies of a global ID value and a global version value respectively, the global ID value and the global version value are stored in a shared record shared by the plurality of threads wherein each of the plurality of threads maintains a private copy of the local ID value and the local version value which are used exclusively by the each thread. This may allow each thread to locally maintain its version with respect to the versions of the rows of the in-memory database and avoid bottlenecks in accessing a central location (resource) shared by all the threads for storing the versions of all threads.

In a further implementation form of the first and/or second aspects, in case of a suspected contention, a respective thread initiating the HTM transaction updates the respective local ID value and the local version value from the global ID value and the global version value respectively. While maintaining their local copies of the version value, in case of a potential conflict between concurrent HTM transactions, the respective thread(s) may synchronizes their local values with the global values stored in the central location.

In an optional implementation form of the first and/or second aspects, a size of the metadata record is increased to contain a larger ID value to support an increased number of a plurality of threads concurrently initiating the plurality of database transactions. Increasing the metadata record size may allow more threads to concurrently access the in-memory database.

In a further implementation form of the first and/or second aspects, in case the processor determines a possible contention condition, the aborting HTM transaction is re-initiated until exceeding a retry threshold defining a predefined number of retries. In order to reduce abort events, a write HTM transaction may be re-initiated for a predefined number of times before aborting to check whether the concurrent write transactions has completed.

In a further implementation form of the first and/or second aspects, a respective database transaction is aborted after a number of initiation cycles of the HTM transaction exceeds the retry threshold. This may be essential to prevent deadlocks between concurrent database transactions.

In a further implementation form of the first and/or second aspects, a count of the re-initiations is not increased for an application instructed abort event. Application instructed abort events (user abort) is not due to a natural abort event resulting from a conflict and therefore such abort events are not counted by the conflict (abort) management mechanism.

In a further implementation form of the first and/or second aspects, one or more of the aborting HTM transaction(s) and the other HTM transaction(s) are forced to apply a global lock to serialize the accesses to the certain row. In order to ensure proper execution following an abort event, one of the conflicting database transactions may need to utilize a global locking mechanism to gain exclusive access to the row and complete the execution through a serialized execution flow preventing concurrent transactions from accessing the same row(s).

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the disclosure can involve performing or completing selected tasks manually, automatically, or a combination thereof. Moreover, according to actual instrumentation and equipment of embodiments of the method and/or system of the disclosure, several selected tasks could be implemented by hardware, by software or by firmware or by a combination thereof using an operating system.

For example, hardware for performing selected tasks according to embodiments of the disclosure could be implemented as a chip or a circuit. As software, selected tasks according to embodiments of the disclosure could be implemented as a plurality of software instructions being executed by a computer using any suitable operating system. In an exemplary embodiment of the disclosure, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced. In the drawings.

DETAILED DESCRIPTION

Figure 1:
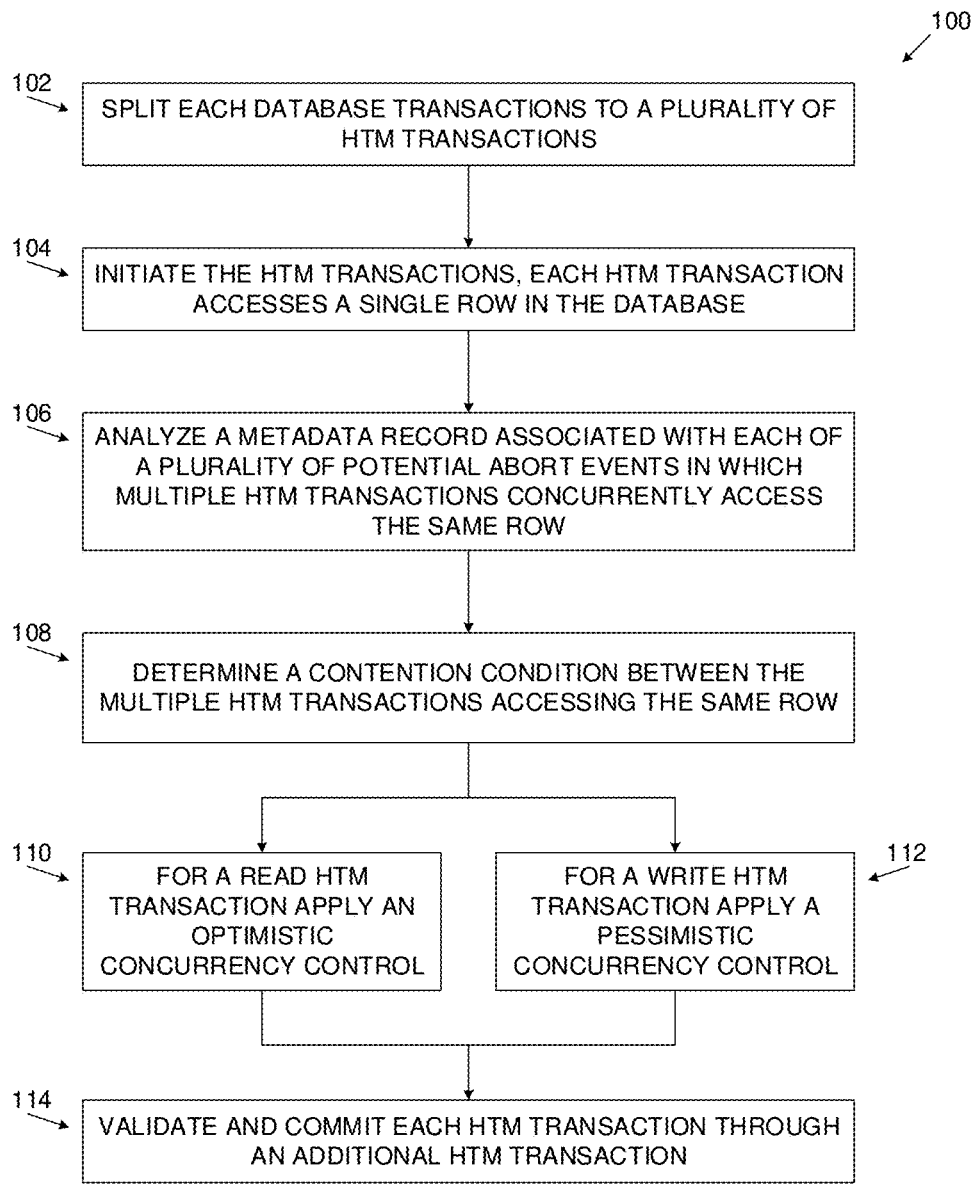
FIG. 1 is a flowchart of an exemplary process of accessing an in-memory database using a Split Transaction Execution (STE) methodology, according to some embodiments of the present disclosure.

The present disclosure, in some embodiments thereof, relates to managing abort events of database transactions to an in-memory database and, more particularly, but not exclusively, to managing abort events of database transaction to an in-memory database which are split to a plurality of HTM transactions.

According to some embodiments of the present disclosure, there are provided methods, systems and computer program products for utilizing an HTM which supports atomic HTM transactions for accessing an in-memory database through a plurality of database transactions initiated concurrently by a plurality of threads. The plurality of threads may run on one or more cores of one or more processors.

There are several challenges to overcome and problems to solve in order to implement a high performance in-memory database serving a plurality of threads concurrently accessing the database. The in-memory database comprising a plurality of rows resides in a system memory which is typically utilized by DRAM, in particular HTM shared by the plurality of threads. As result, segments of the database, e.g. rows of the database may typically be cached in one or more caches available to the threads, for example, a Level 1 (L1) cache, a Level 2 (L2) cache and/or a Level 3 (L3) cache. This imposes several restrictions, for example, the cache line is typically limited to a relatively small size, for example, 64 bytes. Therefore, a database transaction may typically not fit into a cache line. Another restriction is due to the need for maintaining cache since multiple threads may access the same row(s). This implies that data (temporarily) stored in the cache(s) needs to be presented in its most updated version to each of the plurality of threads which may access the database concurrently. Yet another requirement is to prevent contention in the database that may result from multiple threads accessing the same data in the database. This may require each database transaction to complete atomically, i.e. without another transaction altering the data content of the row(s) accessed by a certain database transaction. Furthermore, the restrictions may be inter-dependent and may affect each other.

The challenges of the in-memory database implementation may be addressed by a STE described herein the current disclosure. The STE presents a novel approach for taking advantage of hardware mechanisms that may efficiently control accesses to the database to achieve high performance database access while resolving the problems described herein before. In particular, the STE takes advantage of the HTM ability to assure atomicity of each HTM transaction. Each of the plurality of HTM transactions is executed atomically with no other HTM transaction interfering (with respect to the same data) while the HTM transaction is in progress. The HTM may be utilized by, for example, the Intel HTM which is supported by the Intel IA instruction set Transactional Synchronization Extensions (TSX) to support the HTM transactions. The STE also takes advantage of the hardware cache coherency control mechanism(s) available by the hardware platform, i.e. the processor(s).

Employing the STE algorithm, each database transaction initiated by one of the threads is first split to a plurality of HTM transactions. Each of the HTM transactions may be adapted to access a single row (fitting into the cache line) of the in-memory database thus the HTM transaction fits into the cache line. The STE may provide an Application Programming Interface (API) to allow one or more software modules, for example, a utility, a script, a plug-in and/or the like which initiate database transactions to use the STE implementation.

The HTM transactions are controlled using an efficient realistic mechanism for detecting and preventing contention between concurrent database transactions initiated by the threads while serving database transactions with minimal latency. The realistic implementation relies on combining optimistic concurrency control for read HTM transactions with pessimistic concurrency control for write HTM transactions. Naturally, contention issues arise when two or more concurrent HTM transactions access the same row in the database, in particular a read HTM transaction following (at substantially the same time) a write HTM transaction (read-after-write) or two concurrent write HTM transactions.

The optimistic concurrency control implies that for a read HTM transaction, a transaction abort will be issued only rarely. First there is no contention issue for two read HTM transactions which may each proceed uninterrupted. During the read HTM transaction the accessed row is checked to determine whether another write HTM transaction currently accesses the same row (i.e. the row is live). In case there is no concurrent write HTM transaction, the read HTM transaction proceeds normally to commit the HTM transaction. In case a concurrent write HTM transaction is detected, the read HTM transaction fetches a previous version of the content of the row. Immediately before committing the read HTM transaction, the status of the row is rechecked. In case the row is still live, the read HTM transaction commits with the fetched previous version of the row. In case the row is no longer live, i.e. the concurrent write HTM transaction completed, the read HTM transaction re-initiates to fetch the content of the row as updated by the concurrent write HTM transaction.

The pessimistic concurrency control implies that for a write HTM transaction, checking for a concurrent write HTM transaction by checking whether the row is live is done immediately at initiation. In case there is no concurrent write HTM transaction, the write HTM transaction proceeds normally to commit the HTM transaction. In case a concurrent write HTM transaction is detected, the write HTM transaction immediately aborts to avoid processing the later write HTM transaction thus preventing redundant processing work that may be lost as the write HTM transaction will probably eventually abort. Optionally, the write HTM transaction is re-initiated a predetermined number of time (according to a predefined retry threshold), to check whether the concurrent write HTM transaction completed. After aborting, the write HTM transaction may apply a global lock to serialize the accesses to the row and gain exclusive access to the row.

The status of the accessed row as well as synchronization of the HTM transactions of the same database transaction is maintained through a novel identification signaling method. The identification system comprises a unique identifier (ID) value assigned to each of the threads and a version value associated with each of the threads. The version value is a self-incrementing value which is incremented by the respective thread upon each successful commit of a database transaction. A global structure, for example, a Global Last Committed version Array (LCA) may be created in which a slot is allocated for each of the threads. Each slot may store the respective thread's assigned ID value and the current version value. Each database transaction is identified by the ID value of the respective thread that initiated the database transaction and the current version value of the respective thread. Each of the rows in the database is also assigned with a row ID value which reflects the ID value of the respective thread that performed the most recent successful commit to the row and a row version indicating the version value of the respective thread at the time of the successful commit.

During each HTM transaction to a row of the database, the row ID and row version values are compared against the ID and version values of the database transaction comprising the respective HTM transaction. Based on the comparison, a probability for contention may be determined by identifying whether a concurrent write HTM transaction is currently in progress to the same row. There may be several possible scenarios.

Assuming a read HTM transaction is initiated to a certain row and identifies a concurrent write HTM transaction to the same certain row. In a first scenario the read HTM transaction and the write HTM transaction may be part of the same database transaction. Such read-after-write operation is allowed as the data of the certain row is contained within the context of the same database transaction and the read HTM transaction may therefore proceed normally. In a second scenario the concurrent write HTM transaction is part of another database transaction. In such case the read HTM transaction fetches a previous version of the row content (data) created by the concurrent write HTM transaction, possibly as part of the undo-set of the write HTM transaction. During a validate-and-commit operation which is conducted for the read HTM transaction as a separate HTM transaction, immediately before the commit, the validate-and-commit HTM transaction checks whether the write HTM transaction finished. In case the write HTM transaction is not finished, the validate-and-commit HTM transaction commits with the fetched previous version of the row data. In case the concurrent write HTM transaction is finished, the read HTM transaction may be re-initiated to fetch the updated row content as written by the concurrent write HTM transaction.

Assuming a write HTM transaction is initiated to a certain row and identifies a concurrent write HTM transaction already accessing the same certain row. The write HTM access identifying the concurrent write HTM transaction immediately aborts to avoid redundant processing of the write HTM transaction that will eventually abort. Optionally, on detection of the concurrent write HTM transaction, the write HTM transaction re-initiates a predefined number of times (according to a predefined threshold) to check whether the concurrent write HTM transaction finished. Once the threshold is exceeded, the write HTM transaction aborts to prevent a deadlock and the database transaction may restart. In contrast to the read HTM transaction, the validate-and-commit operation is done within the write HTM transaction (in-place) immediately after acquiring access to the row in order to minimize the contention window. The actual memory access made by the write HTM transactions to the database row may be done immediately prior to the commit operation. This may significantly reduce the contention window since the period of time in which the write HTM transaction is actually manipulating the row and the probability that another HTM transaction will access the same row at that minimal contention window may be significantly reduced.

The threads accessing the database and updating their version values need to constantly update the global LCA to synchronize their version values with each other to maintain integrity of the contention detection mechanism. This may cause a bottleneck for accessing the global LCA since the plurality of threads may need to frequently access the global LCA and may therefore prevent scaling the STE to high number of threads concurrently accessing the database. In order to eliminate this bottleneck and allow for scaling, each thread may maintain a local LCA (cached LCA) which is used exclusively by each thread. The local LCA may be synchronized with the global LCA only when a potential contention is detected, i.e. the row ID and row version ID are different from the ID value and version value which are stored in the local LCA.

The STE may present significant advantages compared to existing methods for controlling database transactions.

Some of the existing methods may not utilize HTM transactions supported by modern memory technologies such as the HTM. As result, in order to prevent contention of concurrent database transactions, complex software mechanisms may be required to assure atomicity of the database transactions. Such implementation may inflict a high performance penalty due to the serialization of the database transactions. Moreover, the data segments accessed and/or required by the database transactions may violate the cache line size thus reducing the efficiency of the cache(s) and expose it to frequent abort events. In addition, the atomic execution of the database transactions may further increase the amount of database transaction abort events since the granularity of the database transactions is crude as each database transaction may access multiple rows of the database. This may require large segments of the memory to be cached thus increasing the possibility for contention between concurrent database transactions accessing the same segments of the database even if not accessing the exact same rows. By splitting the database transactions to HTM transactions, the STE may avoid the software implemented mechanisms for atomicity ensuring and take advantage of the efficient HTM hardware mechanisms assuring atomicity to maintain high performance access to the database. Moreover, splitting the database transactions to the HTM transaction each adapted to access a single row may assure that the HTM transactions comply with the cache line size restriction thus significantly increasing the effectiveness of the cache(s) and significantly increasing database access performance. In addition, by accessing the database through the HTM transactions, the granularity of the memory segments cached in the cache(s) is significantly increased since each HTM transaction accesses only the actual row it needs while avoiding caching of adjacent rows that may not be required. This may significantly reduce the database transaction abort events which in turn may significantly increase database access performance.

Some of the existing methods on the other hand may utilize HTM transactions, for example, the Time Stamp Ordering (TSO) algorithm as described in publication "Scaling HTM supported Database Transactions to many Cores" by Leis, V., Kemper, A., and Neumann, T., whose disclosure is incorporated herein by reference. However, the TSO algorithm uses a global time stamping mechanism that is shared by all the threads and may therefore cause a bottleneck preventing scaling of the TSO algorithm to large numbers of threads. In contract to that, the STE may prevent the bottleneck using the local copies of the global LCA (cached LCA) where each thread exclusively uses its local LCA eliminating the bottleneck in accessing the global LCA.

Moreover, by applying the optimistic concurrency control for the read HTM transactions and the pessimistic concurrency control for the write HTM transactions, the STE may significantly increase the database access and processing performance. Since contention between two write HTM transactions may be detected very early in the transaction, i.e. at the initiation stage, and aborting the write HTM transaction in case of a concurrent write transaction, redundant processing work may be avoided to process write HTM transactions that may eventually abort. On the other hand, the performance of read HTM transactions, in particular read-after-write HTM transaction, may be significantly increased since the optimistic concurrency control may assure minimal abort events resulting of concurrent read and write HTM transactions.

Furthermore, executing the validate-and-commit operation in a separate HTM transaction may allow maintaining compliance with the cache line size restrictions while taking advantage of the atomicity attribute of the HTM. Therefore even for excessive database transactions, in particular large read database transactions the compliance with the cache line size restrictions is maintained. In addition reducing the contention window as done by the STE during the validate-and-commit HTM transaction may further contribute to reducing the HTM transaction abort events which translates to reduced number of database transaction abort events and may therefore significantly increase performance of the STE.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process of accessing an in-memory database using a STE methodology, according to some embodiments of the present disclosure. An exemplary process 100 may be executed to utilize an HTM supporting atomic HTM transactions for implementing an in-memory database serving a plurality of threads running on one or more cores of one or more processors. An STE execution method is applied in which each database transaction is split to a plurality of HTM transactions each accessing a single row. The STE implements a realistic concurrency control in which optimistic concurrency control is applied to read HTM transactions while pessimistic concurrency control is applied to write HTM transactions. Contention between concurrent HTM transactions is detected, controlled and prevented through an identification signaling mechanism which significantly increases access and/or execution performance of the in-memory database. The identification signaling comprises identifying each database transaction as well as each row in the database with ID values and version values indicating the thread which initiated the database transaction that committed the most recent content (data) to the row and the version of that thread at the time of the commit operation.

Figure 2:
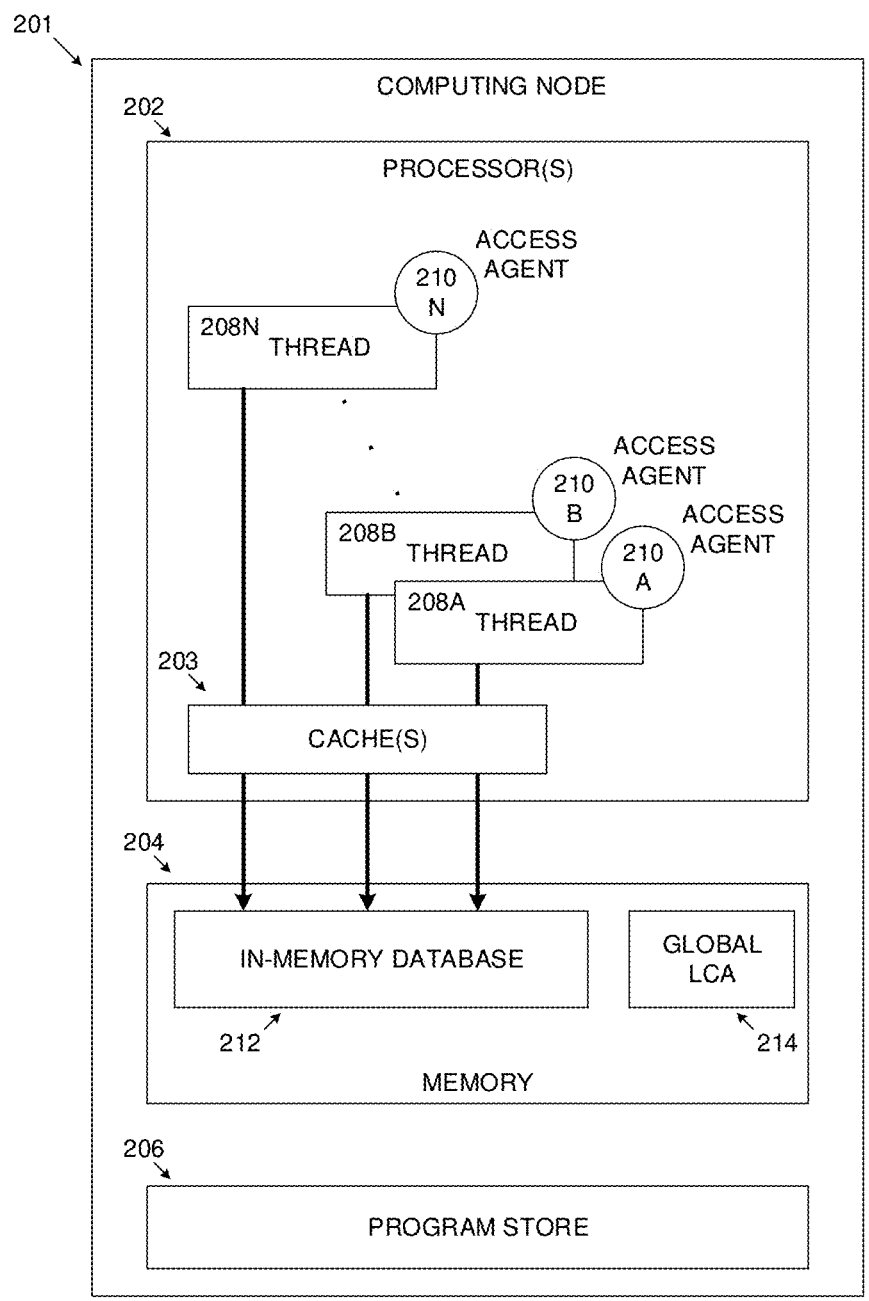
FIG. 2 is a schematic illustration of an exemplary system for accessing an in-memory database using a STE methodology, according to some embodiments of the present disclosure.

Reference is also made to FIG. 2, which is a schematic illustration of an exemplary system for accessing an in-memory database using a STE methodology, according to some embodiments of the present disclosure. An exemplary system 200 may execute the STE process such as the 100 for utilizing an HTM supporting atomic HTM transactions for implementing an in-memory database serving a plurality of threads running on one or more cores of one or more processor. The system 200 comprises a computing node 201 for example, a computer, a server, a cluster of computing nodes and/or any computing device. The computing node 201 may include a processor(s) 202, a memory 204 and a program store 206.

The processor(s) 202, homogenous or heterogeneous, may be arranged for parallel processing, as processor cluster(s) and/or as one or more multi core processor(s). The processor(s) 202 may support hyper-threading such that each core of the processor(s) 202 may execute a plurality of threads 208 each executing independently while sharing the resources of the processor(s) 202 and/or the resources of the computing node 201, for example, computing resources, memory resources, storage resources and/or the like. The processor(s) 202 may further include a cache(s) 203, for example, an L1 cache, an L2 cache, an L3 cache and/or the like which may be exclusively used by one or more of the threads 208 or shared among a plurality of the threads 208.

The memory 204 may include one or more volatile devices, for example, DRAM components and/or the like. The memory 204 may further include high-speed persistent memory such as for example, non-volatile dual in-line memory module (NVDIMM-N) components and/or the like. In particular the memory 204 includes HTM such as, for example, the Intel HTM and/or the like supporting atomic HTM transaction through, for example, the Intel IA instruction set TSX extension. The memory 204, in particular the HTM may store an in-memory database 212 comprising a plurality of rows.

The storage 206 may include one or more computer readable medium devices, for one or more purposes, for example, storing program code, storing data, storing intermediate computation products and/or the like. The storage 206 may include one or more persistent memory devices, for example, a Flash array, a Solid State Disk (SSD) and/or the like for storing program code.

Each of the threads 208 may execute one or more one or more software modules, for example, a process, an application, an agent, a utility, a script, a plug-in and/or the like. Wherein a software module may comprises a plurality of program instructions stored in a non-transitory medium such as the memory 204 and/or the program store 206 and executed by a thread such as the threads 208. Each thread 208 may execute, for example, an instance of an access agent 210 for applying the STE to access the in-memory database 212. The access agent 210 may provide an API to allow one or more software modules which initiate database transactions to interact with the access agent 210 in order to employ the STE implementation.

The access manager 210 may use one or more data structures, for example, a table, a list, an array and/or the like, in particular, a global Last Committed versions Array (LCA) 214 stored in the memory 204 for identifying contention conditions between concurrent HTM transactions. Each of the threads 208 is assigned a unique ID (tid) and a local monotonous self-incrementing version counter (tv). A slot is allocated for each of the threads 208 in the global LCA (lca) 214 which stores the version value tv for each of the threads 208 in the respective slot identified by the tid value. While the global LCA 214 may be shared by all the threads 208, each of the threads 208 maintains a local copy (cached_lca) of the global LCA 214 which may be used exclusively by the respective thread 208. Upon each successful database commit, the respective thread 208 writes its current version value tv in the respective slot in the global LCA 214, i.e. lca[tid]←tv. The thread 208 that committed successfully then updates the local LCA (cached_lca), i.e.

increments tv locally. The use of the global LCA 214 and the local LCA copies is described herein after.

Figure 3:
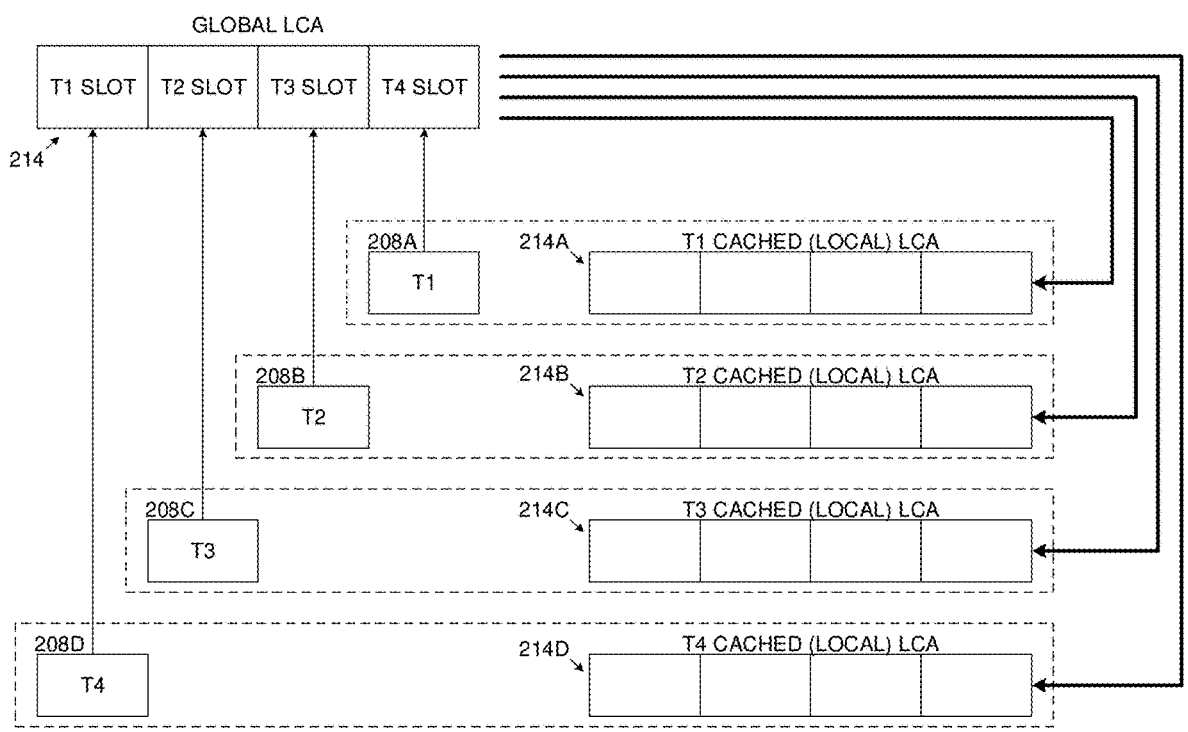
FIG. 3 is a schematic illustration of an exemplary global and local Last Committed versions Arrays (LCA) maintained by a plurality of threads, according to some embodiments of the present disclosure.

Reference is now made to FIG. 3 which is a schematic illustration of an exemplary global and local Last Committed versions Arrays (LCA) maintained by a plurality of threads, according to some embodiments of the present disclosure. An exemplary system such as the system 200 comprises four threads such as the threads 208, a thread T1 208A, a thread T2 208B, a thread T3 208C and a thread T4 208D. The threads 208A-208D are each assigned a slot in a global LCA such as the global LCA 214. Each slot is identified by the unique tid of the respective thread 208 and stores the current version tv of the thread. Each of the threads 208A-208D maintains a local copy of the global LCA 214 such that, the thread T1 208A maintains a local LCA 214A, the thread T2 208B maintains a local LCA 214B, the thread T3 208C maintains a local LCA 214C and the thread T4 208D maintains a local LCA 214D.

Reference is made once again to FIG. 1 and FIG. 2. As shown at 102, the STE process 100 starts with the access agent 210 splitting each database transaction T to a plurality of HTM transactions such that each HTM transaction is adapted to access a single row in the database 212 hence fit in size into a single cache line of the cache(s) 203. By adapting the HTM transaction to fit the cache line size restriction, HTM transaction aborts due to the cache line capacity limitation may be extremely rare. The access agent 210 analyze the database transaction to identify which rows of the database 212 are accessed by the database transaction and split the database transaction to the plurality of HTM transactions accordingly. Each database transaction T is identified by a unique set of ID value and version value of the respective thread 208 initiating the database transaction. Each row in the database 2121 also has the attributes row ID value (rid) and a row version value (rv), which are the ID and version of the last database transaction T that wrote the content (data) of the row.

As shown at 104, the access agent 210 initiates the plurality of HTM transactions created from splitting the database transaction. Whenever a write HTM transaction is accessing a certain row (initiated and gain access to the row), the certain row is marked as live and a copy of the previous content (data) of the row (prev) is created and stored, i.e. the prev stores the most recent successfully committed content of to the row before the write HTM transaction starts altering the row. The prev includes the most recent committed (previous) content of the row as well as the rid and the ry of the database transaction that performed the most recent successfully commit. This means that the prev link is set only while a live write database transaction T is writing (accessing) to the row. Optionally, the prev points to the undo-set of the live database transaction T whose write HTM transaction currently writing to the row.

As shown at 106, for each HTM transaction the access agent 210 analyzes a metadata record of a potential abort event to identify a potential contention condition in which the row currently accessed by the HTM transaction is concurrently accessed by another write HTM transaction. The metadata record, for example, a structure, a list a collection of variables and/or the like comprises the row ID value (rid), the row version value (rv), the ID value (tid) of the HTM transaction and the version value (tv) of the HTM transaction where the tid and the tv of the HTM transaction are the tid and the tv of the database transaction T.

As shown at 108, the access agent 210 identifies a potential contention scenario for the HTM transaction by comparing the rid, rv, tid and tv retrieved from the metadata record. The access agent 210 may employ an access function, Access( ), presented in pseudocode excerpt 1 below for executing the access (read and write) HTM transaction. The access agent 210 may provide the Access( ) function as part of its API.

---

Pseudocode Excerpt 1:

```
Precondition: Executed in HTM transaction
 1   function Access(row, type)
 2       if row.id = tid ∧ row.rv = tv then
 ▷ Access after write by same database transaction
 3           return row
 4       endif
 5       if type = read then
 6           if lca[row.rid] ≤ row.rv then
 7               rs ← (row, row.rid, row.rev)
 ▷ Row is committed, add data to read - set for validation
 8               return row
 9           else
10               rs ← (row, row.prev.rid, row.prev.rev)
 ▷ Row is live, read last commited data to read - set
11               return row.prev
12           endif
13       endif
14       if type = write then
15           retry:
16           if lca[row.rid] ≤ row.rv then
17               e ← copy(row)    ▷ Row committed, create undo - set
                                      entry
18               row.prev ← e
19               row.rid ← tid
20               row.rv ← tv
21               _xend            ▷ Succesful write, commit HTM
                                      transaction
22               return row
23           else
24               if tid < row.rid then
25                   goto retry   ▷ Re - initiate up to retry threshold
26               else
27                   _xend        ▷ Failed write, commit HTM
                                      transaction
28                   return null  ▷ Abort to prevent deadlock
29               endif
30           endif
31       endif
32   end function
```

---

As expressed in a precondition in pseudocode excerpt 1, the Access( ) function is called from within the HTM transaction. The Access( ) function receives as parameters the accessed row (row) and the type of the HTM transaction (type). First the Access( ) function checks, as seen in line 2 whether the accessed row was already written by the (same) executing database transaction T by comparing the rid and ry to the current local values tv tid. In case the HTM transaction is an access after another write HTM transaction of the same database transaction T, the row may be reused for the current HTM transaction and nothing is recorded in a read-set (for a read HTM transaction) or an undo-set (for a write HTM transaction). This implementation demonstrates the reduced overhead of the STE by avoiding redundant processing (work) to create the read-set or the undo-set when unnecessary. In case the HTM transaction is not following another write HTM transaction of the same database transaction T, the Access( ) function splits to two different paths, one path for a read HTM transaction (lines 5-13) and another path for a write HTM transaction (lines 14-30).

As shown at 110, for a read HTM transaction, the access agent 110 applies an optimistic concurrency control. As seen in line 6, the Access( ) function checks whether the accessed row is committed or whether the accessed row is currently being written by a concurrent write HTM transaction. In case the row is committed, as seen in line 7, the Access( ) function adds the current ry and rid of the row as well as a pointer to the row itself to the read-set (rs) and the current row is used by the read HTM transaction. However, In case the row is currently being written by the concurrent write HTM transaction of another database transaction, as seen in lines 9-11, the Access( ) function fetches a previous version of the contents of the row committed during the most recent successful commit (before the concurrent write HTM transaction accessed the row). As seen in line 10, the Access( ) function adds (fetches) the previous version of the contents of the row to the read-set (rs) using the prev link. The Access( ) function further adds (retrieves) the respective rid and ry associated with the previous version of the content of the row, i.e. the tid and tv of the database transaction that made the most recent successful commit to the row. This means that the data is read (fetched) from the copy of the previous version of the row content. As seen in pseudocode excerpt 1, in case of the read HTM transaction, the read HTM transaction commits outside the Access( ) function (there is no_xend commit function call) through an additional validate-and-commit HTM transaction, i.e. after the actual reading from the row is completed.

As shown at 112, for a write HTM transaction, the access agent 110 applies a pessimistic concurrency control. As seen in line 16, similarly to what is done in line 6 for the read HTM transaction, the Access( ) function checks the rid and ry of the accessed row to identify whether the row is live, i.e. whether a concurrent write HTM transaction is writing to the row. The Access( ) function makes this check immediately at the initiation of the HTM transaction to identify as early as possible the potential contention condition and abort immediately without investing computing resources, for example, processing resources, processing time, memory resources and/or the like to process the write HTM transaction that will eventually abort anyway. In case the row is not live, i.e. no concurrent write HTM transaction is accessing the row and the content of the row is committed, as seen in lines 17, the Access( ) function creates an undo-set for the write HTM transaction. As seen in lines 18-20, the Access ( ) function creates the previous copy prev for the accessed row and links prev including the rid and ry to the undo-set of the write HTM transaction. As seen in line 21, in this case the Access( ) function commits immediately after acquiring exclusive access to the row thus performing commit in place by initiating the _xend commit function call. However, as seen in lines 23-29, in case the Access( ) function detects a concurrent write HTM transaction (live row) as seen in line 24, the Access( ) function immediately ends the write HTM transaction as seen in line 27 and aborts as seen in line 28 to break the symmetry and avoid a deadlock condition between concurrent write HTM transactions. Optionally, the Access( ) function re-initiates the write HTM transaction to allow the write HTM transaction to gain access to the accessed row in case the concurrent write HTM transaction completed by now. A retry threshold may be predefined to indicate the number of retry cycles, for example, 10. The Access( ) function may therefore re-initiate the write HTM transaction as seen in line 25 until the number of retry cycles exceeds the predefined threshold level.

As shown at 114, the access manager 110 initiates a validate-and-commit operation for the HTM transaction. During the validate-and-commit operation, the access manager 110 validates the read HTM transaction, i.e. verifies the read HTM transaction constructs a valid snapshot of the row data and commits written data to the committed state for the write HTM transaction. Both the validate operation and the commit operation are executed in the same HTM transaction. The access agent 210 may employ a ValidateCommit ( ) function presented in pseudocode excerpt 2 below for executing the validate-and-commit operation through an additional HTM transaction. The access agent 210 may provide the ValidateCommit( ) function as part of its API.

Pseudocode Excerpt 2:

```
1    function ValidateCommit(T)
2        status ← commit
3        _xbegin                          ▷ Start HTM transaction
4        for e ∈ T.rs
5            if e.rid = tid then
6                continue                 ▷ Write transaction after read
                                            transaction
7            endif
8            if e(rid,rv) = e.row(rid,rv) then
9                continue                 ▷ Write transaction to a row that is
                                            not live
10           endif
11           if lca[e.row.rid] ≥ e.row.rv then
   ▷ Row is live - newer write transaction committed
12               status ← aborted
13               break
14           endif
15           if e.row.prev(rid,rv) ≠ e(id,rv) then
   ▷ Row committed data is different
16               status ← aborted
17               break
18           endif
19       end for
20       if status = commit then
21           lca[tid] = tv
22       endif
23       _xend                            ▷ Commit HTM transaction
24       if status = commit then
25           increment(tv)
26       else
27           rollback(T)
28       endif
29   end function
```

The ValidateCommit( ) function receives as parameters the database transaction T such that each HTM transaction that is part of the database transaction T (split from the database transaction T) is validated and committed. As seen in lines 3-26, the ValidateCommit( ) function initiates and executes an additional HTM transaction.

As seen in lines 4-22, the ValidateCommit( ) function verifies, for the read HTM transactions, that the content of the accessed row is valid and is the most recently successfully committed data and that newer data was not written to the accessed row by a later concurrent write HTM transaction (after the read HTM transaction fetched the accessed row's content). This verification may be done through a three steps validation.

First, as seen in line 5, the ValidateCommit( ) function checks whether the concurrent write HTM transaction has the same tid as the current database transaction T. As seen in line 6, in case the read HTM transaction and the concurrent write HTM transaction are of the same database transaction T, the read HTM transaction may proceed (continue). Such read-after-write within the same database transaction T is allowed since the read HTM transaction may fetch the most updated content of the accessed row data as committed by the (self) concurrent write HTM transaction from the context of the database transaction T which may be common to HTM transactions of the same database transaction T.

Then, as seen in line 8, the ValidateCommit( ) function checks whether the row rid and ry values logged by the read HTM transaction during the Access( ) function (retrieved from the read-set (rs) of the database transaction T) are the same as the as the current row rid and ry values. As seen in line 9, in case the row rid and ry values are the same, the read HTM may proceed (continue).

As seen in line 11, the ValidateCommit( ) function checks whether the concurrent write HTM transaction finished, i.e. whether the row ry value is larger than the row ry value logged by the read HTM transaction during the Access( ) function (retrieved from the read-set (rs) of the database transaction T). As seen in line 12, the read HTM transaction aborts since the row content fetched during the Access( ) function (fetched from the prev link) is not the most recently successfully committed data.

As seen in line 15, the ValidateCommit( ) function checks whether a later concurrent write HTM transaction accessed the row (after the HTM read transaction has fetched the row data). Such scenario may be expressed by the row ry value (in e) being different than the row ry value (in e.row.prev). As seen in line 16, the read HTM transaction aborts since the row content fetched during the Access( ) function (fetched from the prev link) is not the most recently successfully committed data.

As seen in lines 23-24, for the write HTM transactions that successfully committed data in the accessed row, the ValidateCommit( ) function updates the global LCA 214 (lca) with the tid and tv of the database transaction T. As seen in line 25, after updating the global LCA 214 (lca), the ValidateCommit( ) function increments the local version value (tv) in the local LCA (cached_lca). As seen in lines 26-27, in case the write HTM transaction does not successfully commit data in the accessed row, the database transaction is rolled-back and aborts.

Figure 4:
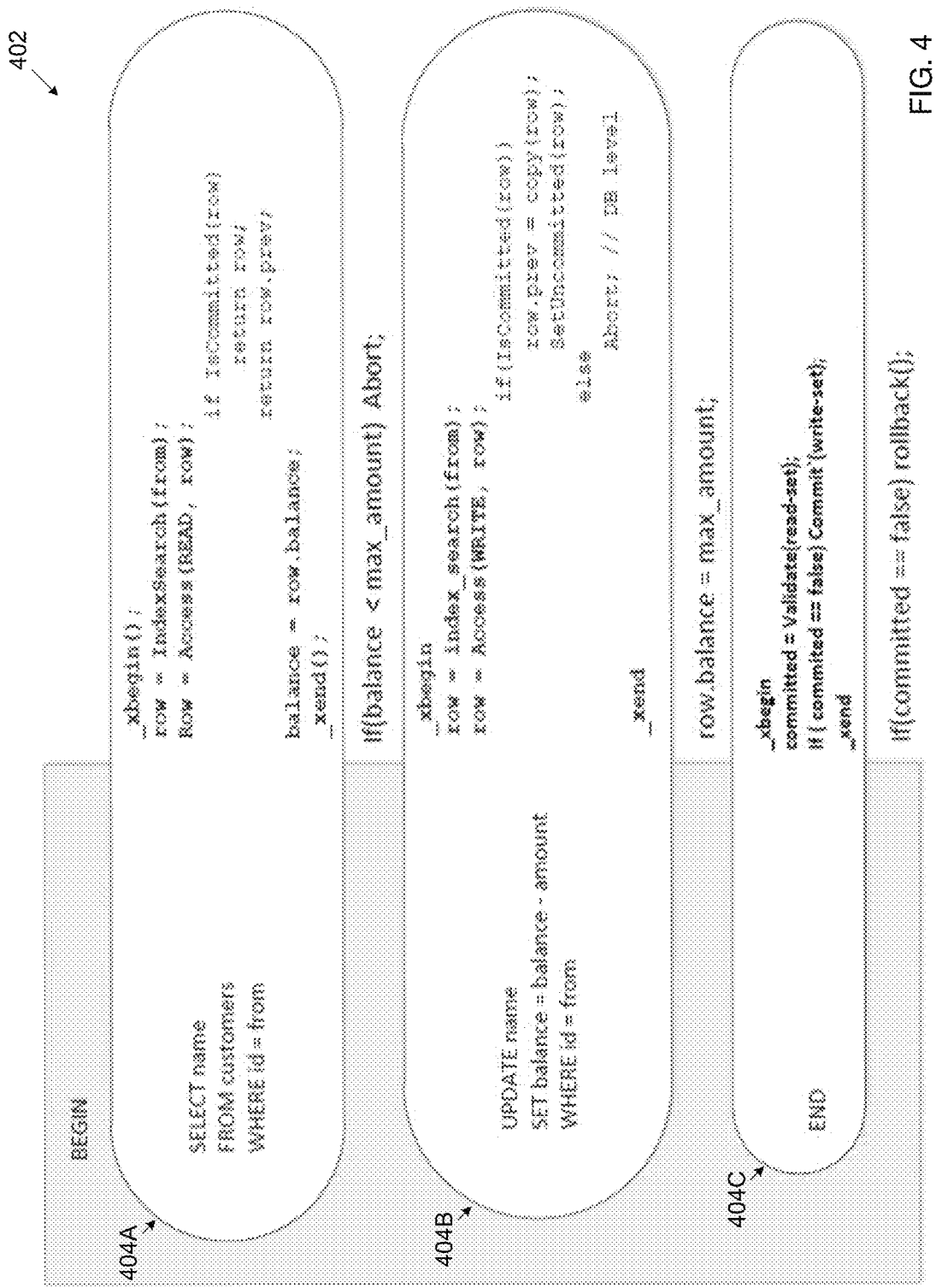
FIG. 4 is a schematic illustration of an exemplary STE execution for concurrent HTM transactions, according to some embodiments of the present disclosure.

Reference is now made to FIG. 4 which is a schematic illustration of an exemplary STE execution for concurrent HTM transactions, according to some embodiments of the present disclosure. An exemplary STE execution flow 402 employing a process such as the process 100 presents a simplified high level view of exemplary search query language (SQL) database transactions to an in-memory database such as the database 212 in which concurrent read HTM transaction and write HTM transaction may conflict. Each of the ellipsoids 404A, 404B and 404C holds an SQL statement which fits in a single split executed within the context of a single HTM transaction, where the ellipsoid 404A utilizes a read HTM transaction, the ellipsoid 404B utilizes a write HTM transaction and the ellipsoid 404C utilizes a validate-and-commit HTM transaction. The bold code is an exemplary C code implementation of the respective SQL statement which calls the relevant STE API, for example, the Acecss( ) function and the ValidateCommit( ) function of an access manager such as the access manager 110 and the plain code is an exemplary STE implementation as implemented by the access manager 110. As described herein before, both the Acecss( ) function for accessing the row in the database 212 and the ValidateCommit( ) function for validating and committing the data accessed during the Acecss( ) function, are executed as atomic HTM transactions.

As shown in read HTM transaction 404A and the write HTM transaction 404B, the HTM transaction is started before index search, (IndexSearch( ), to facilitate an HTM based concurrent index. HTM based indexing however is out of the scope of the present disclosure and therefore related issues, such as, for example, insert and/or delete operations as well as specific data structures are not discussed. After the index search, within the same HTM transaction 404A, the Acecss( ) function of the manager 110 is called to perform the data access. Two exemplary auxiliary functions are introduced which may be implemented, for example, within the access manager 110—IsCommitted ( ) which is used for both read HTM transactions and write HTM transactions and SetUncommitted( ) which is used in the write HTM transaction. The execution flow 402 is simplified by assuming each HTM transaction accesses a row once, so the SetUncommitted( ) function and the IsCommitted( ) function may be unaware of the executing transaction. In addition, the Acecss( ) function may add the access to the read-set (in case of read HTM transaction) or the undo-set (in case of write HTM transaction) and does other calculation, which for brevity and clarity are not described herein. During the (optimistic) read HTM transaction 404A, the IsCommitted( ) function may be used to determine whether to use the current or previous version of the row (content). This may be done entirely within the HTM transaction context, so the _xend( ) instruction to commit the access (read or write) HTM transaction may be called only after the user transaction fetched the content (data) from the row, and not in the Acecss( ) function. However, as seen for the successful pessimistic read HTM transaction 404B, which acquires exclusive access in the Acecss( ) function, the data may be committed (written to the row) within context of the write HTM transaction (row=Access(Write,row)). Before committing the write HTM transaction, the copy of previous content of the row (most recently successfully committed version of the row) is linked (row.prev=copy(row)). A discussed herein before, the copy (prev) may reside within the undo-set of the writing database transaction. The exclusive access is granted to the write HTM transaction by the SetUncommitted( ) function, and accordingly, the write HTM function fails (aborts) if the IsCommitted( ) function returns false.

The STE execution as described in the process 100 is designed and implemented to resolve two main restrictions of the HTM transactions described herein above which are inherent to implementation for accessing the in-memory database 212. The first restriction is the cache line size limitation and associativity and this restriction is resolved by splitting the database transaction to a plurality of HTM transactions adapted to fit into a cache line (step 102). The second restriction relates to overreaction to conflicts, i.e. potential contention conditions, in which concurrent HTM transactions access the same row and therefore typically the same cache line where at least one of the HTM transactions writes to the row. Currently existing methods as known in art may typically abort the database transaction at detection of the conflict as the concurrent transactions may abort each other until one of the concurrent transactions is forced to take a global lock. Reducing the number of abort events relating to the database transactions aborts which are software triggered due to potential conflict(s) in the database level and may be named explicit aborts, is therefore a major challenge that is efficiently addressed by the STE employing the process 100. The STE applies two main mechanisms for reducing the amount of abort events—caching the global LCA 214 (lca) to maintain local LCA copies (cached_lca) for each of the threads 208 and minimizing the contention (conflict) window. These mechanisms may be applied during one or more of steps 106, 108, 110, 112 and 114 of the process 100 and are now described in further detail. In order to use the software triggering of the explicit aborts, the STE may use further hardware mechanism(s), for example, the Restricted Transactional Memory (RTM) mode of the Intel TSX block as opposed to the Hardware Lock Elision (HLE) mode which may be used by the existing methods for accessing the database 212.

Caching the global LCA 214 (lca) may be done to remove a potential bottleneck that may be caused by frequent and asynchronous accesses and updates the threads 208 need to make to the global LCA 214 (lca) in order to maintain the validity, consistency and/or integrity of the accessed rows' content (data). As shown in pseudocode excerpt 1, a thread 208 *t*_1 which initiates an HTM transaction to a certain row of the database 212 by executing the Access( ) function needs to access the global LCA 214 (lca) to read the slot associated with a thread 208 *t*_2 which concurrently writes to the same row. The slot of the thread 208 *t*_2 in the global LCA 214 (lca) may be updated frequently and asynchronously by the thread 208 *t*_2. These update operations may cause the HTM transaction initiated by the thread 208 *t*_1 to abort since the HTM transaction initiated by the thread 208 *t*_1 practically wraps the access execution (Access( ) function) of the concurrent write HTM transaction initiated by the thread 208 *t*_2.

In order to reduce the number of accesses made by the threads 208 to the global LCA 214 (lca), each thread 208 maintains a local copy of the global LCA 214 (lca), i.e. the cached_lca as described herein before. The cached_lca may be partially outdated and therefore at critical times as described herein after, the thread 208 may need to access the global LCA 214 (lca) in order to synchronize its local cached_lca with the global LCA 214 (lca). Therefore, the access manager 110 may typically use the cached_lca local copy and access the global LCA 214 (lca) only when a suspected conflict may be due to an unsafe cached_lca local copy, i.e. an outdated cached_lca local copy. This may significantly reduce the number of accesses made to the global LCA 214 (lca) thus removing the potential bottleneck.

As seen in lines 6 (for read HTM transactions) and 16 (for write HTM transactions), in case the accessed row is live which is identified by the values rid and ry of the accessed row being more recent than the tid and tv of the HTM transaction, the thread 208 executing the Access( ) function may use the cached_lca instead of the global LCA 214 (lca). However, in case the Access( ) function determines the row is live, it may be due to an outdated cached_lca[id] in the cached_lca. In such case, when a suspected concurrent HTM transaction is in progress, the Access( ) function may trigger an abort for the HTM transaction with the rid value of the accessed row and the type of the concurrent HTM transaction in order to allow the thread 208 to update its cached_lca [id]. To trigger the HTM transaction abort the Access( ) function may use a utility function htm_ste_abort presented in code excerpt 1 below.

Code Excerpt 1:

```
1     void htm_ste_abort(uint8_t reason)
2     {
3         switch (reason)
4         {
5             case 0:
6                 _xabort(0);
7             case 1:
8                 _xabort(1);
9                 .
10                .
11            case READ_ROW|0:
12                _xabort(READ_ROW|0);
13            case READ_ROW|1:
14                _xabort(READ_ROW|1);
15                .
16                .
17            case DB_ABORT:
18                _xabort(DB_ABORT);
19            case RETRY:
20                _xabort(RETRY);
21            default:
22                _xabort(ILLEGAL_CODE);
23        }
24    }
```

As seen in code excerpt 1, the actual abort trigger to abort the HTM transaction is the intrinsic _xabort(code) of the Intel IA instruction set TSX extension. However, since the intrinsic _xabort(code) requires an immediate parameter, a separate condition may be used for each case (scenario). This may be done efficiently by the branch table in the switch condition in line 3. This implies that the tid may be limited to 126 since the intrinsic _xabort( ) code argument is limited to provide the upper byte (8 bits) for the immediate value and one bit is reserved for identifying the access type. The reminder of the code argument is dedicated for the fallback lock. In order to In order to support more than 126 threads, multiple tids may need to be overloaded on the same code argument which is inefficient and may limit scalability of the STE to more than 126 threads 208. In order to allow for improved scalability, more abort information may be transferred to the htm_ste_abort( ) abort handler of the explicit HTM transaction abort. This may be accomplished by one or more techniques, methods and/or implementations, for example:

Implement non transactional writes by new ISA and/or assign a dedicated address range. Allow write operations to (processor) hardware registers that are not restored on HTM aborts. Such registers may exist, but currently, writing them in an HTM transaction triggers a mandatory abort. This approach may require a simple patch to the Basic Input/Output System (BIOS) of the processing node 201 as known in the art. The return value of _xbegin( ) where the user abort code is multiplexed, has 16 reserved bits which may be used to transfer the abort information to the htm_ste_abort( ) abort handler.

As discussed before, the STE may be implemented for the Intel HTM using the Intel IA instruction set TSX extension supporting the HTM transactions. The STE may employ an exemplary ste_begin function presented in code excerpt 2 below to control the HTM transactions.

Code Excerpt 2:

```
25    void ste_begin(volatile bool * fallback_lock)
26    {
27        while (true) {
28            status = _xbegin( );
29
30            if (status == _XBEGIN_STARTED)
31            {
32                if (fallback_lock == locked)
33                    htm_ste_abort(RETRY)
34                retrun true;   // Started HTM transaction
35            }
36
37            else
```

Code Excerpt 2:

```
38              {
39                  // Got an HTM transaction abort
40                  if (status & _XABORT_EXPLICIT)
41                  {
42                      // Got user HTM transaction abort
43                      if (code ! = HTM_RETRY)
44                      {
45                          // Get the id (uid) to update
46                          uid = code & CORE_MASK;
47
48                          if (cached_lca[uid] ! = lca[uid])
49                          {
50                              cached_lca[uid] = lca[uid]);
51                          }
52                          else
53                          {
54                              // No updates for the version
55                              if (code & READ_ROW)
56                              {
57                                  // Trnasaction (row) is live
58                                  live = uid;
59                                  continue;
60                              }
61                              else
62                              {
63                                  // Break deadlock
64                                  if (id > uid)
65                                      retrun false;
66                              }
67                          }
68                      }
69                  }
70                  else
71                  {
72                      htm_retry + +;
73                  }
74
75                  if (htm_retry < MAX_RETRY)
76                  {
77                      break;
78                  }
79
80              }
81          }
82
83          // Fallback. In real code retry may be predefined to, for example, 10
84          Lock(fallback_lock);
85
86          retrun true;
87      }
```

The ste_begin function returns true if the HTM transaction started successfully and false in case a database transaction abort is required due to conflicting HTM transactions causing a potential contention condition. As seen in line 28 an HTM transaction context is started (_xbegin). As seen in line 32 the HTM transaction gained access to the row, i.e. fallback_lock=locked and may successfully start thus the ste_begin function returns true. In case of a conflict or capacity abort due to a concurrent HTM transaction, the ste_begin function branches to execute lines 37-80. As seen in line 33, the HTM transaction may be re-initiated a predefined number of retry cycles until exceeding a predefined retry threshold htm_retry (predefined for example as 10) which is a counter incremented at line 72 for every failed start of the HTM transaction. Once the retry threshold is reached, as seen in line 75, the ste_begin function breaks as seen in line 77. After breaking the HTM transaction may branch to a fallback mode, taking a global lock in line 84 and executes serially. Once the HTM transaction takes the fallback_lock, all other HTM transactions will abort as when checking the lock condition in line 32. This serialization may inflict a major performance penalty for accessing the database 212 and demonstrates the benefits of avoiding such conflicts as done by the STE. As seen in lines 43-68, in case the HTM transaction abort event is triggered by an application (user abort), i.e. the abort event is an explicit abort, the HTM transaction execution is not counted as a retry cycle.

In case the ste_begin function detects a potential unsafe rid and ry of the accessed row, the ste_begin function may triggers an explicit abort with the rid of the suspected concurrent HTM transaction and the type of access (read or write) as a parameter to the explicit abort handler. As seen in line 40, the HTM transaction abort handler may identify the abort event is a user triggered abort (user abort) and as seen in line 46, the ste_begin function may extract the tid of the potential concurrent write HTM transaction into uid and try to update the uid from the global LCA 214 (lca) to the cached_lca. In case the cached_lca[uid] was updated as seen in line 50, the ste_begin function may retry the HTM transaction with assuming the ry and uid combination may be safe during the retry cycle. However, if the cached_lca[uid] is not updated, it means the ry and uid identify the row in live and accessed by a concurrent write HTM transaction. In such case the ste_begin function may execute as follows:

For a read HTM transaction: the accessed row is marked as live as seen in line 58 with the uid of the accessing database transaction uid. In case the ste_begin function identifies the same ID value in the rid of the accessed row and the ry of the accessed row remains the same it may indicate there was no database transaction abort. In such case the HTM transaction will fetch (read) the previous version of the row's content (the most recent successfully committed data) as seen in line 10 of the pseudocode excerpt 1. For a write HTM transaction: as seen in line 64, the tid and uid, which must be different are used by the ste_begin function to break the symmetry of the execution. The ste_begin function may determine to abort the database transaction to avoid deadlock by returning false as seen in line 65 of the code excerpt 2. In case the retry threshold is not exceeded, the ste_begin function may initiate a retry cycle to retry initiation of the HTM until the database transaction identified with the uid commits or aborts. Therefore, caching the global LCA 214 (lca) and using local copies cached_lca may significantly reduce conflict aborts that are due to reading the actual last version tv of a concurrently accessing thread 208, while the concurrently accessing thread 208 is frequently updating the respective tv.

However, in various workloads there may be real contention conditions, i.e. multiple threads 208 writing repeatedly to the same row and as a result the database transactions initiated by the threads 208 may abort each other until one or more of the threads 208 are forced to take the serial fallback path. In order to reduce the conflicts and hence the potential contention conditions resulting from the repeated concurrent database transaction accesses to the same row(s), the STE employs one or more mechanisms to minimize the contention window in which the threads 208 may abort each other.

The STE implementation may follow, for example, guidelines dictated by Intel's optimization manual as described in publication "Intel 64 and IA-32 Architectures Optimization Reference Manual, 2016" by Intel whose disclosure is incorporated herein by reference. Following these guidelines, the STE may move the actual conflicting memory access towards the end of the critical section of the HTM transaction. In practice, the conflicting write access may be placed immediately before the HTM commit instruction.

Therefore probability of a (cache) snoop event caused by another thread 208 concurrently accessing the same row, to abort the commit instruction of the HTM transaction is extremely low.

Figure 5:
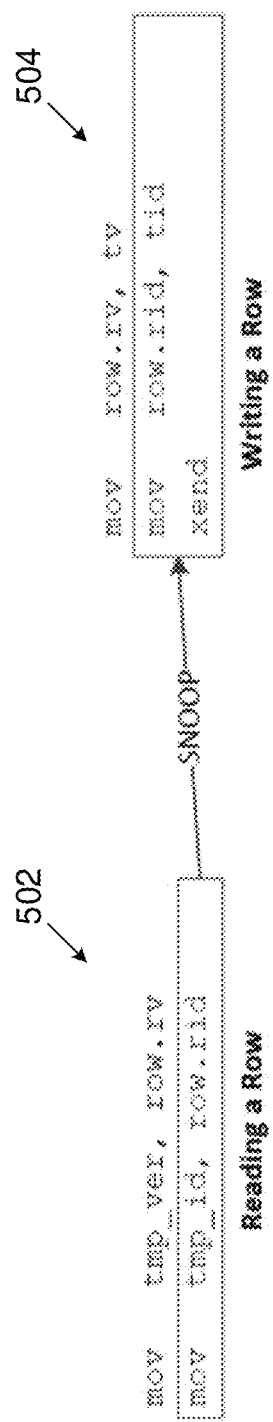
FIG. 5 is a capture of code excerpts demonstrating a minimized contention window, according to some embodiments of the present disclosure.
Figure 6A:
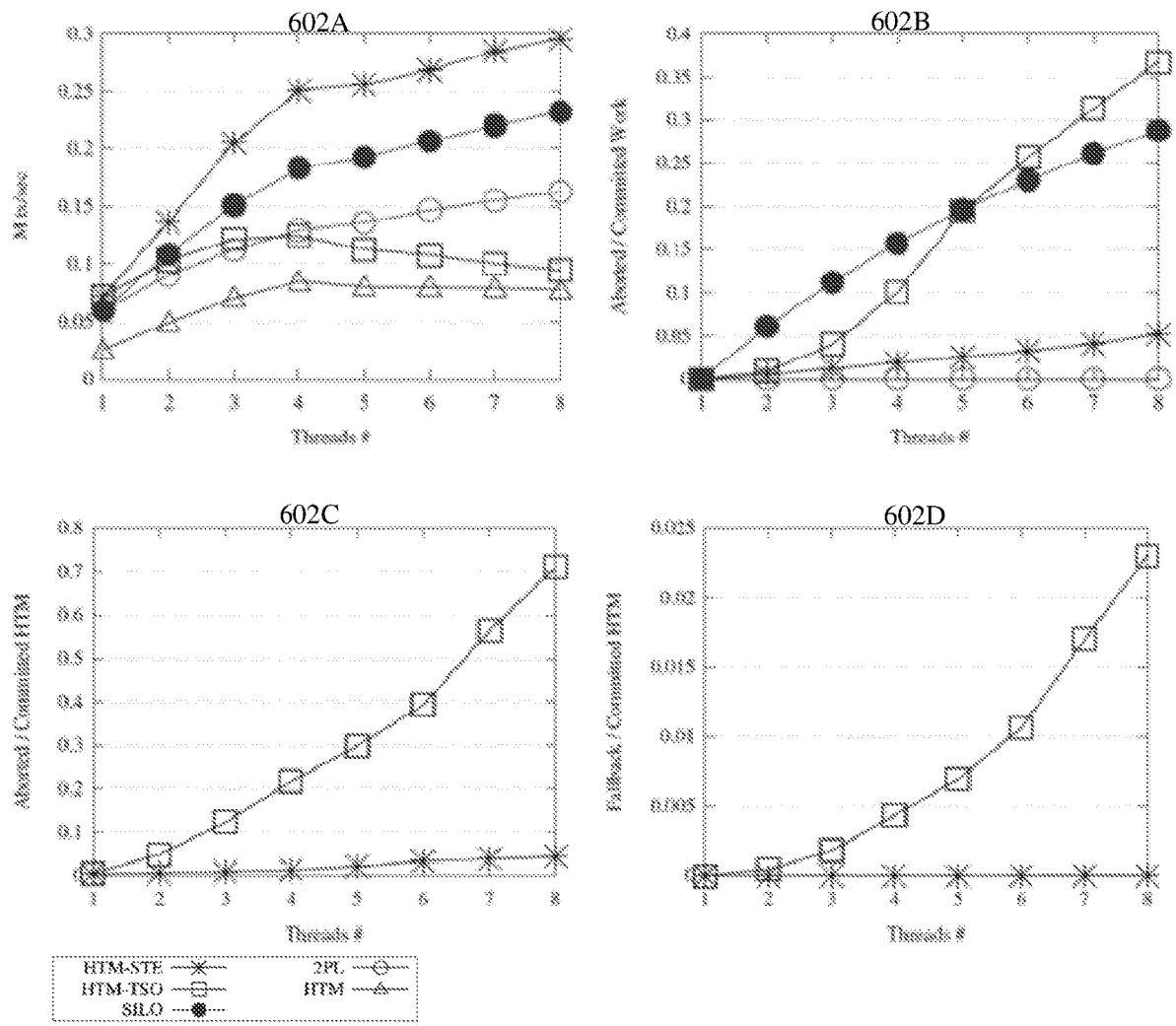
FIG. 6A is a performance comparison graph of experiment results of a TPC-C benchmark having read and write with high contention conducted to compare currently existing methods to a STE methodology for accessing an in-memory database, according to some embodiments of the present disclosure.
Figure 6B:
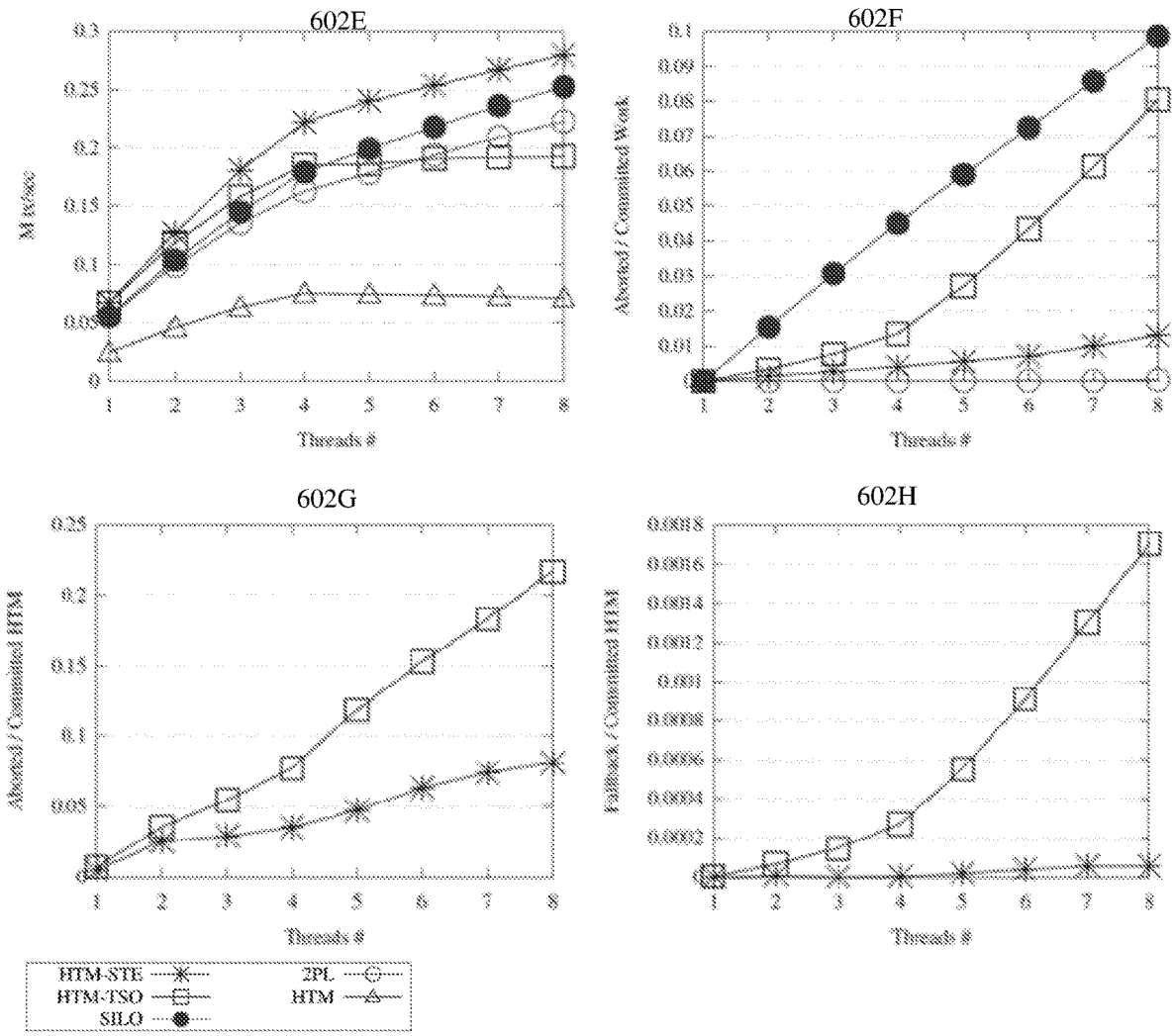
FIG. 6B is a performance comparison graph of experiment results of a TPC-C benchmark having read and write with low contention conducted to compare currently existing methods to a STE methodology for accessing an in-memory database, according to some embodiments of the present disclosure.
Figure 6C:
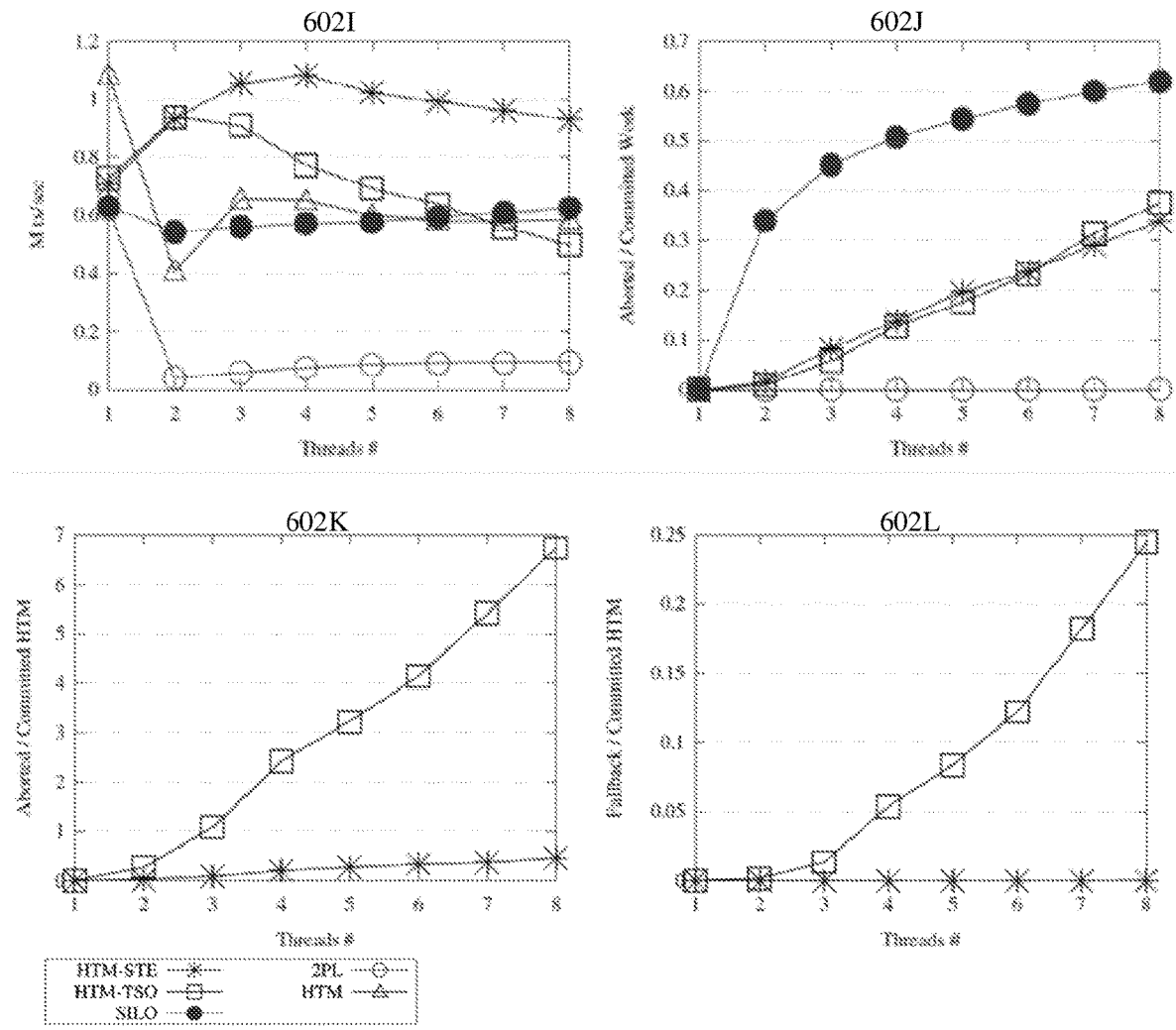
FIG. 6C is a performance comparison graph of experiment results of a TPC-C benchmark having write with high contention conducted to compare currently existing methods to a STE methodology for accessing an in-memory database, according to some embodiments of the present disclosure.
Figure 6D:
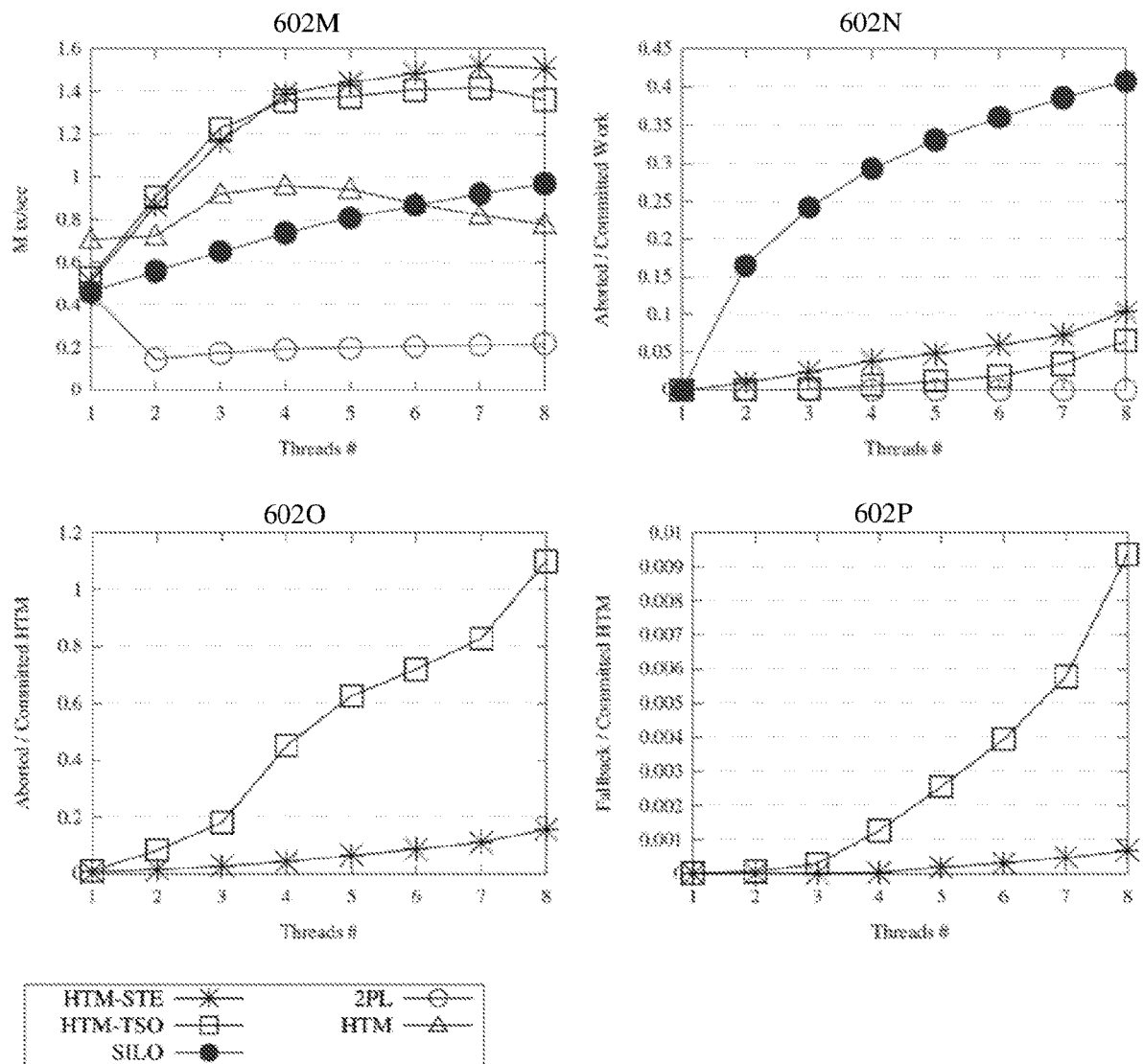
FIG. 6D is a performance comparison graph of experiment results of a TPC-C benchmark having write with low contention conducted to compare currently existing methods to a STE methodology for accessing an in-memory database, according to some embodiments of the present disclosure.
Figure 7A:
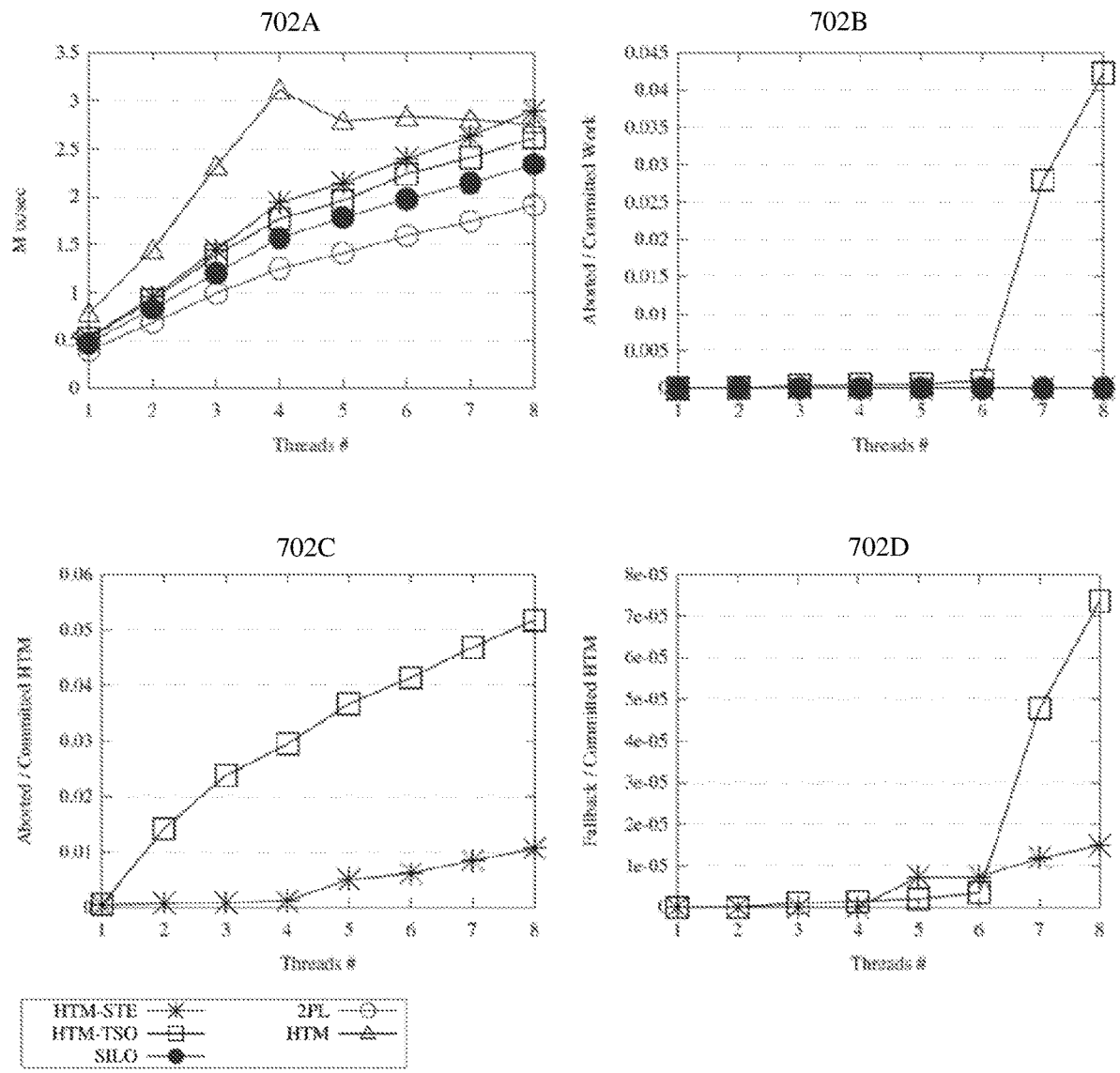
FIG. 7A is a performance comparison graph of experiment results of a Yahoo! Cloud Serving Benchmark (YCSB) conducted having read with low contention to compare currently existing methods to a STE methodology for accessing an in-memory database, according to some embodiments of the present disclosure.
Figure 7B:
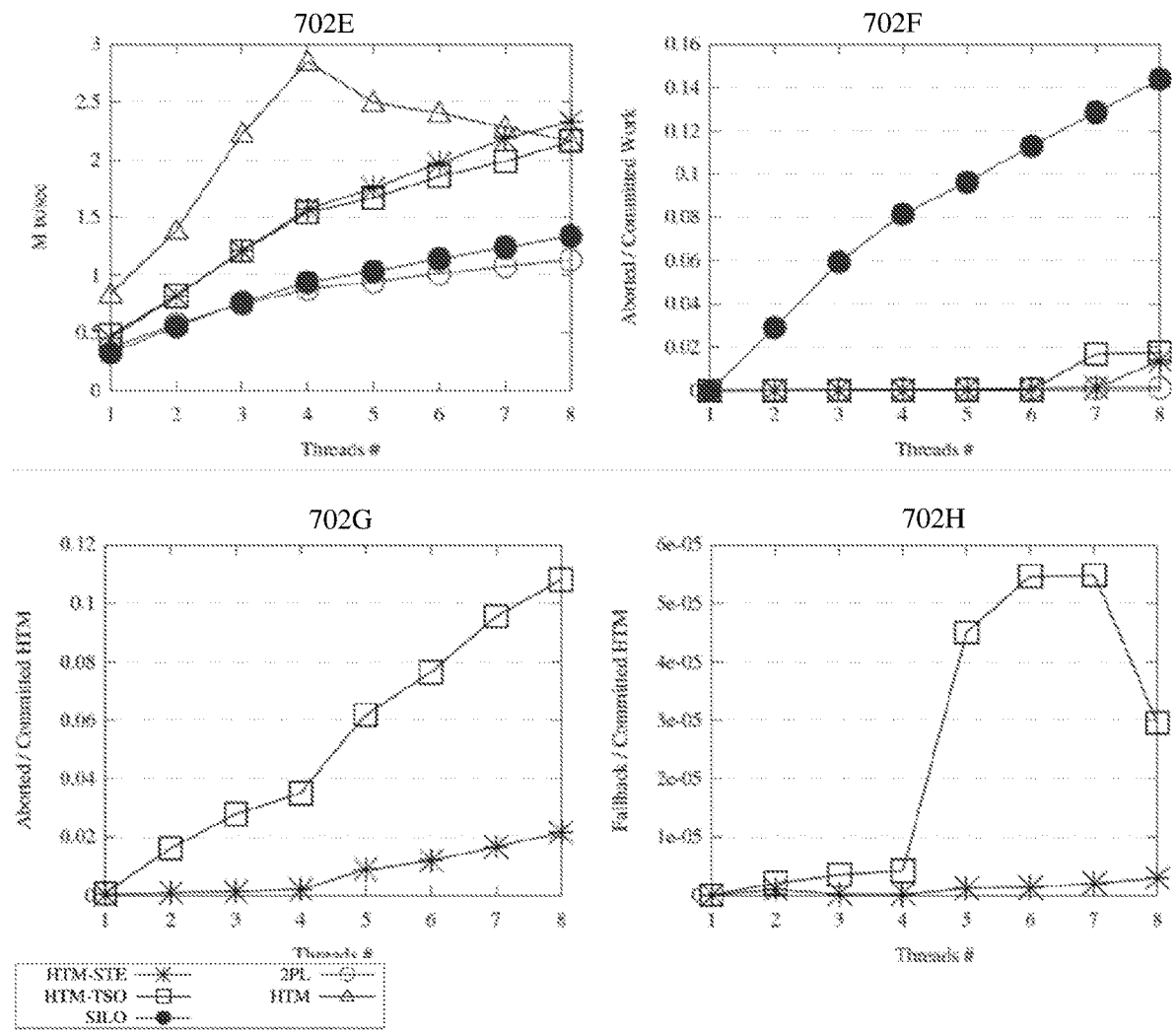
FIG. 7B is a performance comparison graph of experiment results of a YCSB conducted having write with low contention to compare currently existing methods to a STE methodology for accessing an in-memory database, according to some embodiments of the present disclosure.
Figure 7C:
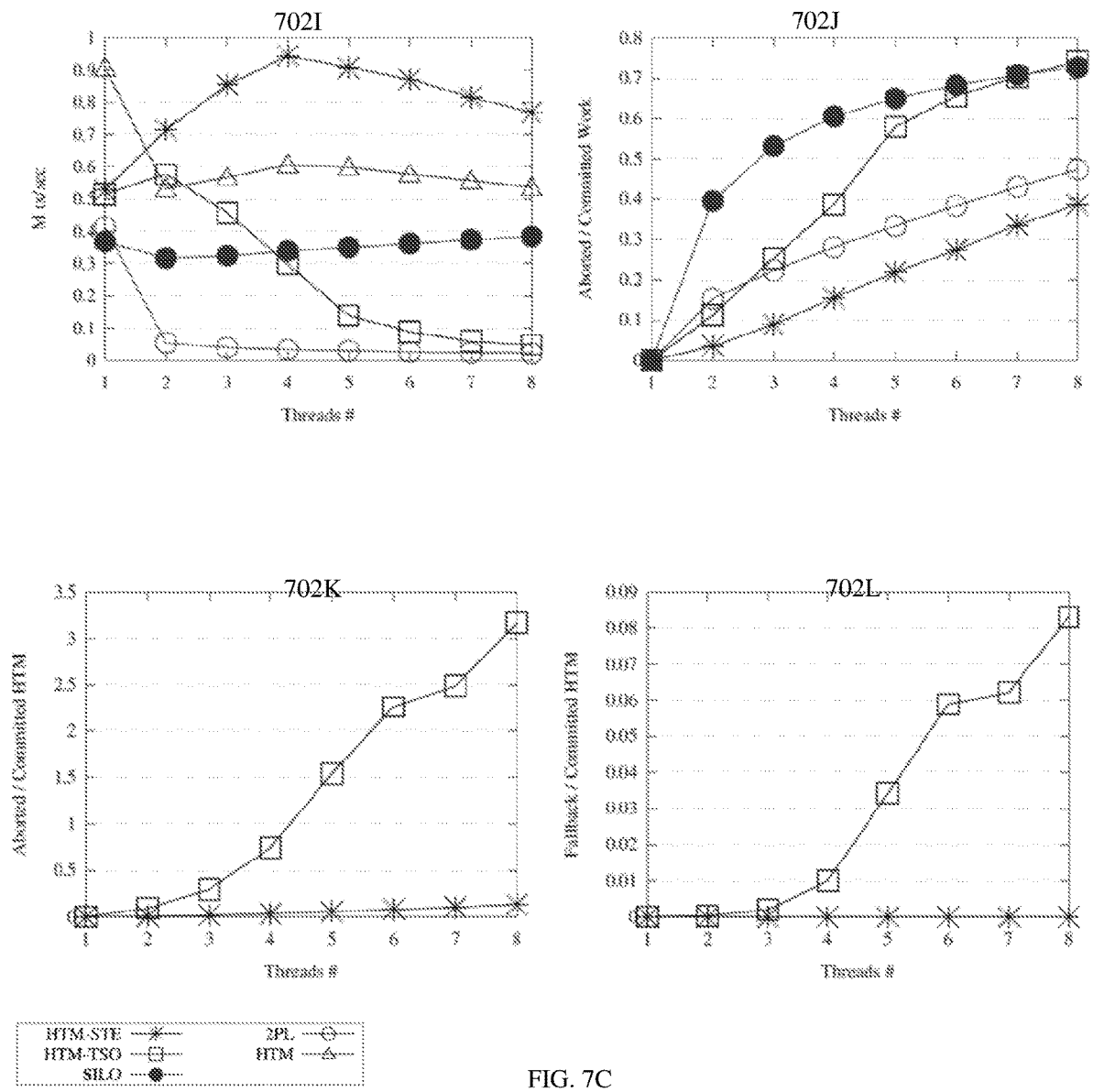
FIG. 7C is a performance comparison graph of experiment results of a YCSB conducted having mostly write with low contention to compare currently existing methods to a STE methodology for accessing an in-memory database, according to some embodiments of the present disclosure.
Figure 7D:
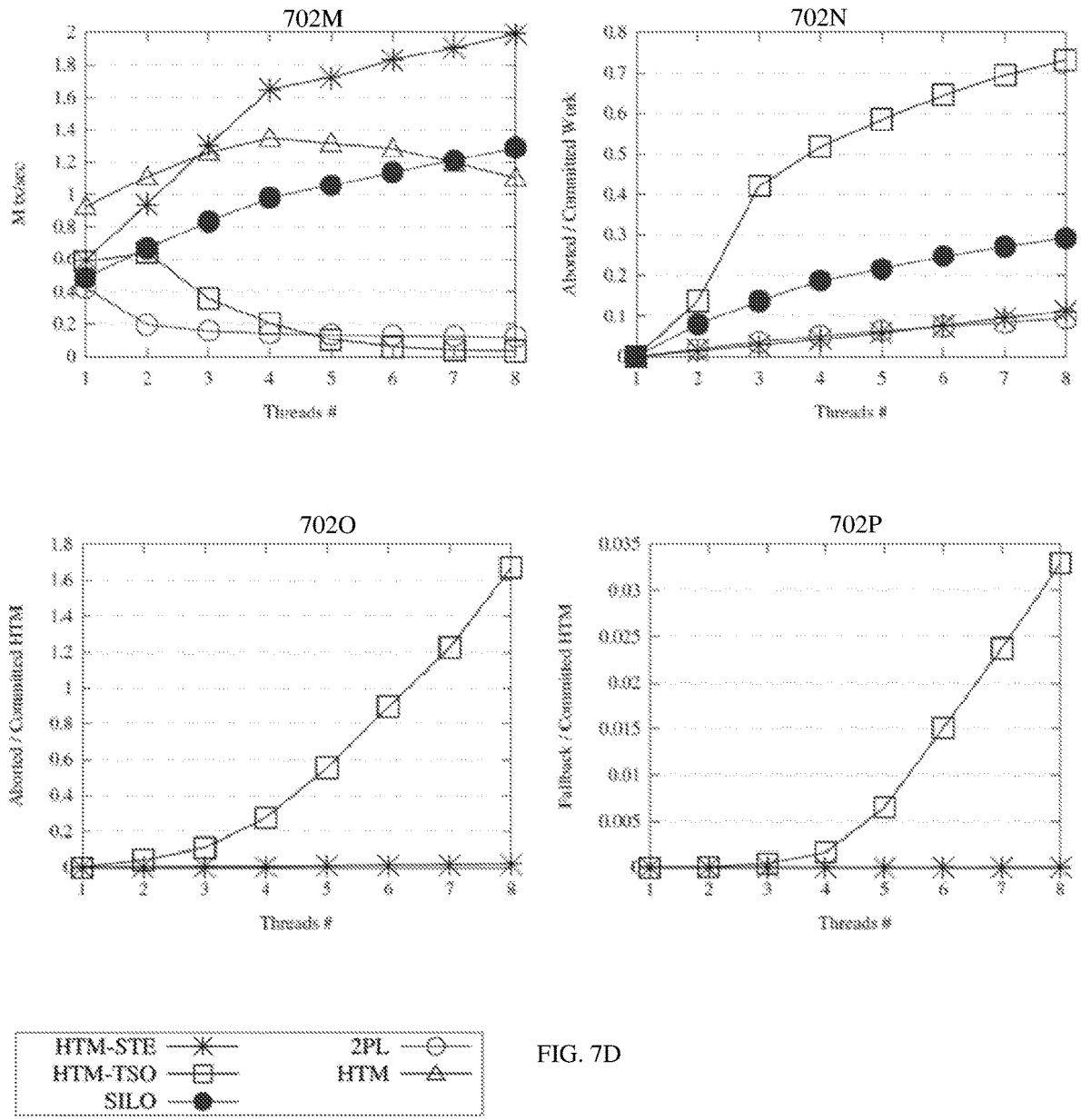
FIG. 7D is a performance comparison graph of experiment results of a YCSB conducted having mostly write with high contention to compare currently existing methods to a STE methodology for accessing an in-memory database, according to some embodiments of the present disclosure.

Reference is now made FIG. 5, which is a capture of code excerpts demonstrating a minimized contention window, according to some embodiments of the present disclosure. A code segment 502, presents a memory access executed during a read HTM transaction T_R and a code segment 504 presents a memory access executed during a concurrent write HTM transaction T_W writing to the same row using the Access( ) function as described in pseudocode except 1. The indicated code lines (in the rectangles) show the time window, referred to as the contention window, in which the write HTM transaction T_W is vulnerable, i.e. the time in which a snoop caused by the concurrent read HTM transaction T_R may inflict an abort to the write HTM transaction T_W. The contention window starts from the cycle when the first shared write completes until the _xend completes. As the _xend is internal to the thread 208 and may require very few machine cycles (of the processor(s) 202), and as the ry and rid are typically in the cache of the thread 208 initiating the write HTM transaction T_W, writing ry and rid may typically last one machine cycle. Therefore the contention window may be very short, lasting a few machine cycles.

The STE therefore significantly reduces the number of abort events of the HTM transactions and as consequence number of abort events of the database transactions thus significantly increasing access performance to the database 212. However, the STE may further reduce the number of HTM transactions abort events for a read or write HTM transaction by reducing and/or eliminating a probability of successive abort events for the same HTM transaction accessing the same row in the database 212.

The read HTM transaction T_R may use the cached_lca and therefore the only shared data (shared with the concurrent write HTM transaction T_W) the read HTM transaction T_R reads from memory is the accessed row identification information. In an embodiment, the rid and ry values of the accessed row are the only variables that are written both by the write access of the write HTM transaction T_W and accessed for read by the read HTM transaction T_R. As result, the probability of a contention between the read HTM transaction T_R and the write HTM transaction T_W is eliminated since the write HTM transaction T_W writes the rid and ry out of the HTM transaction. In case the write HTM transaction T_W write the rid and ry values, before the read HTM transaction T_R reads them and before the read HTM transaction T_R is committed, the read HTM transaction T_R will abort. However, in case the write HTM transaction T_W is committed, than only after the database transaction which initiated the write HTM transaction T_W will commit or abort, another write HTM transaction will be able to write the row rid and ry again. Therefore the probability the read HTM transaction T_R will abort again, is equals approximately the probability that the write HTM transaction T_W which caused the read HTM transaction T_R to abort in the first place will abort and retry, and will write again the same row concurrently with the read HTM transaction T_R.

The sequence of steps executed by the write HTM transaction T_W writing to a certain row is as described for the Access( ) function in pseudocode excerpt 1:

Read the rid and ry of the accessed row.

Check the rid in the cached_lca of the respective thread 208 that initiated the database transaction comprising the write HTM transaction T_W.

Copy the content of the accessed row to a local undo-set entry.

Update (write) the rid and ry of the accessed row.

Commit the write HTM transaction T_W.

In case the write HTM transaction T_W caused the read HTM transaction T_R to abort, it takes place in step 4 where the write HTM transaction T_W writes the row information rid and ry which is limited to few machine cycles and takes place immediately prior to the commit operation. Therefore, the only possibility for the write HTM transaction T_W to abort after it caused the read HTM transaction T_R to abort is in case another HTM transaction reads or writes the rid and ry of the accessed row before the write HTM transaction T_W executes step 5. As seen for the Access( ) function in pseudocode excerpt 1, step 4 is utilized through writing one cache line and the immediately following instruction is step 5, therefore the probability for such a scenario to take place are extremely low.

The STE may apply the same implementation for the validate-and-commit HTM transaction. As seen from pseudocode excerpt 2, a validate-and-commit HTM transaction T_C employing the ValidateCommit( ) function writes to the global LCA 214 (lca) in line 21. The following instruction in line 23 is committing the HTM transaction so a conflict may occur only in case a snoop induced by an HTM transaction initiated by another thread 208 while checking the version (rid) of the accessed row to determine whether the accessed row's content (data) is committed. As the commit instruction requires only a few machine cycles, the probability for such a scenario to take place is very low. However, a cache snoop induced by read from the global LCA 214 (lca) may cause the validate-and-commit HTM transaction T_C to abort. The read from the global LCA 214 (lca) may originate from a user aborted read HTM transaction which gets the previous value and/or from a concurrent validate-and-commit HTM transaction T_V which accesses the global LCA 214 (lca) in order to determine whether the uncommitted row is still uncommitted.

In case the snoop originated from the user aborted HTM transaction, the read HTM transaction fetches the previous content of the row (most recently successfully committed data) and may therefore not retry. Therefore the read HTM transaction may not cause another abort to the validate-and-commit HTM transaction T_C.

In case the snoop originated from the concurrent validate-and-commit HTM transaction T_V, there are two possible scenarios. In the first scenario, the concurrent validate-and-commit HTM transaction T_V completes successfully and therefore does not abort the validate-and-commit HTM transaction T_C again. In the second possible scenario, the validate-and-commit HTM transaction T_C retries and updates (writes) its slot in the global LCA 214 (lca) before the concurrent validate-and-commit HTM transaction T_V commits thus causing the concurrent validate-and-commit HTM transaction T_V to abort. In this case the probability that the concurrent validate-and-commit HTM transaction T_V retries again within the contention window is extremely low since the concurrent validate-and-commit HTM transaction T_V commits immediately after writing to the global LCA 214 (lca) which requires only few machine cycles.

The validate-and-commit HTM transaction may be larger, but it is mostly read-only accesses until the final write access to the global LCA 214 (lca) to update the respective slot of the respective thread 208 which is immediately followed by the commit operation. As the STE may employ the Intel HTM and the Intel IA instruction set TSX extension, the large read-only accesses may not present an issue. This is due to the fact that the Intel HTM may employ large bloom filters to detect conflicts while allowing read-set entries evict from the cache(s) 203 without aborting the HTM transaction. This allows the HTM to accommodate very large read-sets, and the potentially large read-only prefix is therefore tolerable.

Correctness of the STE implementation, i.e. maintaining serialization and avoiding deadlocks may be proved and verified analytically.

First safety of the STE is verified, i.e. serialization of the HTM transactions to follow the order dictated by the execution flow. A database transaction $T\_i$ is a set of reads $r\_i(x)$ and writes $w\_i(x)$ followed by a commit operation $c\_i$ where x are rows of a database containing a plurality of rows X such that x∈X. As known in the art, two operations are said to conflict if they both operate on the same data item and at least one of them is a write access. It is said that an operation $o\_i(x)$ precedes in a conflict an operation $o\_j(x)$ if $o\_i(x)$ is a read access and $o\_i(x)$ is a write access, and the read operation $o\_j(x)$ reads (fetches) the data the write operation $o\_i(x)$ wrote, or if both $o\_i(x)$ and $o\_j(x)$ are write operations and the final value of the row x is written by the write operations $o\_j(x)$.

The serialization graph of an execution, is a directed graph whose nodes are the committed transactions and whose edges are all database transactions $T\_i \rightarrow T\_j$ ($i \ne j$) such that one of $T\_i$'s operations precedes and conflicts with one of $T\_j$'s operations. The serializability theorem maintains that an execution is serializable if and only if it creates an acyclic serialization graph.

Lemma 1: If $T\_i$ and $T\_j$ are two database transactions split using STE and ($i \ne j$), then $c\_i$ and $c\_j$ are serializable.

Proof: As both $c\_i$ and $c\_j$ are executed in HTM transactions, i.e. lines 3 to line 23 in pseudocode excerpt 2 and as HTM implementations have single global lock semantics, either $c\_i \rightarrow c\_j$ or $c\_j \rightarrow c\_i$. Therefore in STE executions, database transactions have inherent order, and it is said that $T\_i$ precedes $T\_j$ if $c\_i$ precedes $c\_j$.

Lemma 2. If two operations $o\_i(x)$ and $o\_j(x)$ conflict, $o\_i(x)$ precedes $o\_j(x)$ if and only if $T\_i$ precedes $T\_j$.

Proof: it is assumed by contradiction that $o\_j(x)$ precedes $o\_i(x)$ in a conflict while $T\_i$ precedes $T\_j$. If the operation $o\_i(x)$ read from (in case $o\_i(x)$ is a read operation) or wrote to (in case $o\_i(x)$ is a write operation) the same row x that the write operation $o\_j(x)$ wrote to, than as seen in line 6 or line 16 in the pseudocode excerpt 1, $T\_i$ identified the tv of $T\_j$ in the global LCA 214 (lca), which means $T\_j$ committed while $T\_i$ was still alive (accessing the row) as seen in line 21 of the pseudocode excerpt 2.

From lemmas 1 and 2 it may be concluded that in case there is an edge from $T\_i$ to $T\_j$ in the serialization graph, than i<j and therefore the graph is acyclic. As such, according to the serializability theorem database transactions T that follow the STE algorithm are serializable.

Now progress of the STE is verified, i.e. avoiding deadlocks to assure progress of execution. Each transaction $T\_i$ in STE has a unique tid, and as seen in line 24 of pseudocode excerpt 1, the tid is used to break symmetry and avoid deadlocks. Thus in case $w\_i(x)$ and $w\_j(x)$ conflict, and the tid of $T\_i$ is greater than the tid of $T\_j$, then 〖w〗$\_j(x)$ may wait for $T\_j$ to commit or abort, while in case $w\_i(x)$ identified the tid of $T\_j$ it aborts to avoid deadlock. As the tid is a unique number, exactly one database transaction may survive the conflict and the deadlock may be avoided. Another aspect of the progress is that in case $T\_i$ writes to a row that $T\_j$ reads, and $T\_j$ writes to a row that $T\_i$ reads, both $T\_i$ and if $T\_j$ may abort and go into a live lock. However, this is not possible, as $T\_i$ may cause $T\_j$ to abort only if $T\_i$ committed, as seen in line 12 of pseudocode excerpt 2 and therefore progress is maintained.

While the STE may be implemented without taking advantage of the HTM and splitting the database transactions to HTM transactions, doing so presents obvious superiority, advantages and benefits. This may be demonstrated by analyzing the STE implementing the Access( ) function and ValidateCommit( ) function presented in pseudocode excerpts 1 and 2 respectively to a closest, most efficient potential implementation that may be achieved without using the HTM transactions. One advantage of the HTM is its capability to accommodate efficient concurrent index operations. However the comparison analysis is focused on the implementation of the STE rather than on HTM features that may benefit any implementation. In particular, the access and validate-and-commit operations are analyzed for comparing the STE with vs. without the HTM transactions.

The access (Access( )) functionality of the STE with and without HTM is first analyzed and discussed. When avoiding HTM transactions, a writing database transaction may need to latch the accessed row before accessing the row, then set the rid, ry and prev fields and finally release the latch of the row. Since STE targets pessimistic write concurrency control, the undo-set may be created using the row versions rid and ry sampled (read) before and after creating a copy of the accessed row's data, i.e. outside the latching period. However in order to set the actual row version values requires latching the row. The use of latching may block not only other writing database transactions but also reading database transactions. However, in addition to waiting for the latch, assuming the reading database transactions do not latch an accessed row for reading, which introduces significant overhead, and instead sample the version values of the accessed row, use the data, and afterward verify the version values are not changed the reading database transactions may encounter the following hazards:

(1) In case there was no concurrent writing database transaction (the accessed row is not live), the reading database transactions may use the actual data. However, in case the concurrent writing database transaction started writing to the accessed row while the reading database transaction is using the row's data, the reading database transaction may use inconsistent data and may therefore experience errors, for example, infinite loops, division by zero, etc.

(2) After the reading database transaction reads the actual data complete, the reading database transaction samples (reads) again the version value ry of the accessed row, to determine that the ry has not changed. However, in STE, as the writing database transactions employ pessimistic concurrency control, it is possible that a writing database transaction writes to the accessed row concurrently, but aborts and restores the version values rid and ry of the accessed row. In this case the reading database transaction may fail to detect the inconsistent (unsafe) version values. To prevent this, the writing database transactions may need to add some abort counting mechanism to the row's version values which may further reduce performance of the database accessing.

(3) The Access( ) function may also use the HTM as a sandbox. A reading database transaction that uses the prev field may read an entry from the concurrent writing database transaction undo-set. In case concurrent writing database transactions completes its execution, the writing database transactions might recycle the buffer holding the undo-set which may cause the reading database transactions to view and/or use inconsistent data. In another scenario, the writing database transactions might free the buffer holding the undo-set and may cause the reading database transactions to experience a segmentation fault. To resolve this some garbage collection mechanism may need to be implemented for the undo-set, which may entail additional overhead.

Therefore, the no HTM transaction implementation of access (Access( ) functionality may not only be more complicated and involve additional overhead, but also allows for less parallelism of the plurality of database transactions accessing the database 212. When a writing database transaction locks an accessed row for writing, no reading database transactions accessing the same row may make progress. In the STE using the HTM transactions on the other hand, a reading database transaction may always make progress. In case a read HTM transaction gets a conflict abort, it implies a concurrent write HTM transaction wrote new content (data) to the accessed row and the committed data is already available to the read HTM transaction in the copy of the previous version of the row's content, row.prev.data.

The validate-and-commit (ValidateCommit( )) functionality of the STE with and without HTM is now analyzed and discussed. Since the STE does not lock accessed rows against read HTM transactions, a database transaction T_1 may read the committed version of the accessed a row while a concurrent database transaction T_2 is writing to the same row. In case of a symmetric implementation without the HTM the database transaction T_1 may see previous committed version (rid and rv) of the accessed row written by the concurrent database transaction T_2, and vice versa, the database transaction T_2 may see previous committed versions of another (different) accessed row written by the database transaction T_1. In such case only one of the database transactions T_1 and T_2 may survive while the other may be forced to abort. Otherwise, the database transaction T_1 may serialize before the database transaction T_2 and the database transaction T_2 may serialize before the database transaction T_1, which is an invalid situation. In HTM based STE, on the other hand, the commit HTM transaction verifies that newer (more recent) write HTM transactions which read the accessed row version values are live and commit, so only one of database transactions T_1 and T_2 may commit.

With lock based STE, i.e. no HTM STE, at commit, the database transaction T_1 must lock its own version and then verify all other writing database transactions (including the database transaction T_2) are live and not locked, and commit. If the database transaction T_1 sees the database transaction T_2 is locked, the database transaction T_1 must abort, as it cannot verify that the database transaction T_2 saw that the database transaction T_1 is locked. However, if the database transaction T_2 did see the database transaction T_1 is locked, the database transaction T_2 must abort as well, which can lead to a live-lock. This situation cannot happen with HTM based STE, were either the database transaction T_1 or the database transaction T_2 may commit, so under high contention, the HTM based STE may present significantly improved concurrency.

The performance, benefits and/or advantages of the methods, processes and systems for enhancing transactions to the in-memory database 212 using the STE methodology as presented in some of the embodiments of the present disclosure are demonstrated through several experiments. The experiments were conducted to simulate real world scenarios using popular benchmarks and workloads. The experiments were conducted using a hardware platform comprising an Intel® Core™ i7-4770 3.4 GHz Haswell processor with 4 cores each with two hyper processes for a total of up to eight threads. Each of the cores has private L1 and L2 caches, whose sizes are 32 KB and 256 KB respectively. There is also an 8 MB L3 cache shared by all the cores.

During the experiments, performance and operational characteristics of the STE algorithm (HTM_STE) as described in the process 100 were compared to multiple existing database transactions execution algorithm. In particular, the STE algorithm was compared to the following algorithms:

HTM_TSO: TSO algorithm in which each thread maintains a Local Version Counter. However, the safe array is global and readers set their version in the node in TSO style as described in publication "Scaling HTM supported Database Transactions to many Cores" by Leis, V., Kemper, A., and Neumann, T., whose disclosure is incorporated herein by reference.

HTM: Plain Intel HTM algorithm as described in the Intel architecture instruction set extensions programming reference.

2PL: Two phase locking with deadlock detection algorithm which employs a pessimistic concurrency control as described in publication "Speedy Transactions in Multicore in-memory Databases" by Tu, S., Zheng, W., Kohler, E., Liskov, B., and Madden, S., whose disclosure is incorporated herein by reference.

SILO: The optimistic concurrency control algorithm operated at best performance mode as described in the publication "Speedy Transactions in Multicore in-memory Databases" by Tu, S., Zheng et al., which is herein incorporated by reference.

The experiments were conducted for several benchmarks and workloads as well as workload variants using a DBx1000 database model such as the database 212 as known in the art which is a scalable single node On-Line Transaction Processing (OLTP) Database Management System (DBMS).

Reference is now made to FIG. 6A, FIG. 6B, FIG. 6C, FIG. 6D, FIG. 7A, FIG. 7B, FIG. 7C and FIG. 7D, which are performance comparison graphs of experiment results conducted to compare currently existing methods to the STE methodology for accessing an in-memory database, according to some embodiments of the present disclosure.

The first experimented workload is TPC-C benchmark as known in the art which is currently considered a standard benchmark for evaluating OLTP systems. The TPC-C consists of nine tables that simulate a warehouse-centric order processing application. However, the experiments presented herein are focused on two out of the five database transactions types of the TPC-C—Payment transaction and New Order transaction with the workload comprised of 50% of each of the two transaction types. These two transaction types constitute approximately 88% of the default TPC-C mix and are the most interesting in terms of complexity for evaluating the STE methodology. Four different variations were simulated and experimented for the TPC-C database transactions:

TPC-C(1): Read and write with high contention—only new-order transactions with two warehouses. Graphs 602A, 602B, 602C and 602D present the experiment results for the TPC-C(1) workload variant.

TPC-C(2): Read and write with low contention—only new-order transactions with eight warehouses. Graphs

602E, 602F, 602G and 602H present the experiment results for the TPC-C(2) workload variant.

TPC-C(3): Write with high contention—only payment transactions with two warehouses. Graphs 602I, 602J, 602K and 602L present the experiment results for the TPC-C(3) workload variant.

TPC-C(4): Write with low contention—only payment transactions with eight warehouses. Graphs 602M, 602N, 602O and 602P present the experiment results for the TPC-C(4) workload variant.

The second experimented workload is Yahoo! Cloud Serving Benchmark (YCSB) as known in the art which may be representative of large-scale on-line services. Each query accesses a single random tuple based on a Zipfian distribution with a parameter (theta–Z) that controls the contention level in the benchmark. Four different variations were simulated and experimented for the YCSB benchmark, where each variation consists of ten access requests:

YCSB(1): Read with low contention—read-only and uniform access distribution (theta=0) with low contention. Graphs 702A, 702B, 702C and 702D present the experiment results for the YCSB(1) workload variant.

YCSB(2): Write with low contention—write-only and uniform access distribution (theta=0) with low contention. Graphs 702E, 702F, 702G and 702H present the experiment results for the YCSB(2) workload variant.

YCSB(3): Mostly write and high contention—high write contention with a hotspot of 10% rows that are accessed by 75% of all queries (theta=0.9), and 90% of the access are writes. Graphs 702I, 702J, 702K and 702L present the experiment results for the YCSB(3) workload variant.

YCSB(4): Mostly read and high contention—high read-write contention with theta=0.9, and 90% of the access are read. Graphs 702M, 702N, 702O and 702L present the experiment results for the YCSB(4) workload variant.

The experiments were conducted to evaluate several performance parameters of the database transactions utilizing the database access algorithms where the presented results are an average of five different executions. In particular, the evaluated performance parameters include:

(1) Bandwidth—measured in terms of transactions per second (Mtx/s—Millions of transactions per second). The graphs 602A, 602E, 602I and 602M present the bandwidth experiments results for the TPC-C(1), TPC-C(2), TPC-C(3) and TPC-C(4) workload variants respectively. The graphs 602A, 602E, 602I, 602M, 702A, 702E, 702I, and 702M present the bandwidth experiments results for the YCSB(1), YCSB(2), YCSB(3) and YCSB(4) workload variant respectively.

(2) Database transactions abort events—expressing the relative part of time (work) spent in executing transactions that were eventually aborted out of the total execution time. The graphs 602B, 602F, 602J and 602N present the database transactions abort events experiments results for the TPC-C(1), TPC-C(2), TPC-C(3) and TPC-C(4) workload variants respectively. The graphs 702B, 702F, 702J and 702N present the database transactions abort events experiments results for the YCSB(1), YCSB(2), YCSB(3) and YCSB(4) workload variant respectively. The evaluation of the database transactions abort events does not include the HTM (Intel plain HTM algorithm) as the HTM has no database transaction aborts.

(3) HTM transactions abort events—expressing the relative part of HTM transactions that were aborted due to conflicts out of total HTM transactions that were initiated. The graphs 602C, 602G 602K and 602O present the HTM transactions abort events experiments results for the TPC-C(1), TPC-C(2), TPC-C(3) and TPC-C(4) workload variants respectively. The graphs 702C, 702G, 702K and 702O present the HTM transactions abort events experiments results for the YCSB(1), YCSB(2), YCSB(3) and YCSB(4) workload variant respectively. The experiments graphs presenting the HTM transactions abort events do not present results for the HTM as the HTM exhibited an extremely large number of HTM transaction making it irrelevant. The HTM results are therefore removed from the experiments results respective graphs to maintain a clear view of the results graphs to allow evaluation of the HTM_STE compared to the relevant algorithms. Also, the evaluation of the HTM transactions abort events does not include the 2PL and SILO algorithms which do not use HTM transactions. The results also do not present HTM transaction abort events resulting from explicit user aborts which are avoided with respect to reverting to the fallback path as described herein before.

(4) HTM fallback events—expressing the relative part of HTM transactions that reverted to the fallback path due to conflicts and/or capacity abort events out of total HTM transactions. The graphs 602D, 602H, 602L and 602P present the HTM fallback events experiments results for the TPC-C(1), TPC-C(2), TPC-C(3) and TPC-C(4) workload variants respectively. The graphs 702D, 702H, 702L and 702P present the HTM fallback events experiments results for the YCSB(1), YCSB(2), YCSB(3) and YCSB(4) workload variant respectively. Once again, the evaluation of the HTM fallback events does not include the 2PL and SILO algorithms which do not use HTM transactions.

As evident from the graphs 602(A-P) and 702(A-P), the HTM_STE presents superior results for all performance parameters over all of the other evaluated database transaction algorithms in all of the benchmarks variants. In general, as seen in the graphs 602A, 602E, 602I, 602M, 702A, 702E, 702I and 702M, the HTM_STE presents better bandwidth performance compared to all the other algorithms in particular with the increase of the number of threads such as the threads 208. While the HTM_STE presents better bandwidth performance, the HTM_STE also completely removes the dependency of the HTM transaction abort events as well as the database transaction abort events from the capacity (i.e. processor utilization) of the threads 208. As evident from the graphs 602C, 602G, 602K, 602O, 702C, 702G, 702K and 702O, when using the HTM_STE, HTM transaction abort events which are due to the capacity are almost extinct. This means that even when increasing the number of threads 208 such that each thread 208 has reduced capacity (processor computing resources) the number of HTM transaction abort events does not increase significantly. This naturally inflicts on the database transaction abort events, which as evident from the graphs 602B, 602F, 602J, 602N, 702B, 702F, 702J and 702N also does not significantly increase with the increased number of the threads 208. With the reduced number of transaction abort events, the number of HTM fallback events is also reduced when using the HTM_STE, as seen in the graphs 602D, 602H, 602L, 602P, 702D, 702H, 702L and 702P.

The performance evaluation results for the HTM_STE are further analyzed with respect to each of the existing database access algorithms.

First the results of the HTM-STE are analyzed compared to the HTM (Intel Plain HTM algorithm). As stated before, the results of the HTM for the database transaction abort events and HTM transactions abort events are presented only for the bandwidth performance parameter graphs (i.e. 602A, 602E, 602I, 602M, 702A, 702E, 702I and 702M).

This is because on one hand the HTM has no database transaction aborts since the HTM transaction encapsulates a full database transaction, and as result, a database transaction abort is translated to an HTM abort. On the other hand, due to capacity limitation and crude conflict detection, when the HTM does abort, the HTM exhibits orders of magnitude more transaction abort events and/or fallback events than the HTM_STE and the HTM_TSO. The HTM presents no overhead since the HTM is only doing the actual work. As expected, in workloads that fit HTM size restrictions, the HTM presents best bandwidth performance. For example, the TPC-C(3), TPC-C(4), YCSB(1), YCSB(2), YCSB(3) and YCSB(4) database transactions do fit in HTM size limitation. Therefore when executed by a single thread such as the thread 208, the HTM presents best bandwidth results for these workload variations which are characterized by low contention for both read only and/or write only workloads as seen, for example, in the graphs 702A and 702E. On the other hand, for the TPC-C(1) (graph 602A) and the TPC-C(2) (graph 602E) the HTM presents the lowest bandwidth performance due to multiple inserts (new orders), which exceed the HTM size limitation. However, even for the database transactions complying with the HTM size limitation when the number of threads 208 accessing the database 212 increases, the bandwidth of the HTM is reduced while the other algorithms, in particular the HTM_STE and the HTM_TSO present improved bandwidth. This is due to the reduced capacity available to each of the threads 208 and the HTM may no longer scale. Therefore, even for workload variations in which the HTM presents the best performance, for example, YCSB(1) (graph 702A) and YCSB(2) (graph 702E), the HTM_STE presents better bandwidth for eight threads 208. For TPC-C workload variations characterized by higher contention, for example, TPC-C(3) or TPC-C(4), the HTM_STE performs better than the HTM even for two or more threads as seen in the graphs 602I and 602M respectively. For YCSB workload variations characterized by higher contention, for example, YCSB (3) or YCSB(4) the HTM_STE performs better than the HTM for even fewer threads 208 accessing the database 212. In the YCSB(4), the HTM_STE presents better performance compared to the HTM for three or more threads 208 as seen in the graphs 702M. In the YCSB(3), the HTM_STE presents better performance compared to the HTM even for two threads 208 as seen in the graphs 702I.

The results of the HTM-STE are next analyzed compared to the SILO algorithm. The HTM-STE exhibits improved performance compared to the SILO primarily due to reduced time spent for aborted transactions (database transactions abort events) as well as the eliminated overhead for read-after-write database transactions. The graphs 702A and 702B present the results for the YCSB(1) that is characterized by low aborted work (i.e. low portion of time is spent on aborted database transactions) coupled with read only database transaction thus experiencing no read-after-write transactions and eliminating the need for the write-set. Therefore, since YCSB(1) comprises only read database transaction there is a low number of database transaction abort events, the time spent on aborted database transactions is significantly reduced as seen in the graph 702B and therefore the bandwidth performance of the SILO is very similar to that of the HTM_STE as seen in the graph 702A. To demonstrate the performance superiority of the HTM-STE compared to the SILO, the analysis is focused on the effects resulting from the read-after write database transactions. As can be seen for the TPC-C, when there are no read-sets (no read-after write) such as in TPC-C(3) (graph 602I) an TPC-C(4) (graph 602M) or when there are few write-sets such as in TPC-C(1) (graph 602A) and TPC-C(2) (graph 602E) the SILO and HTM-STE perform very similarly for a single thread 208. This is also true for the YCSB workloads with read only database transactions such as the YCSB(1) or write only database transactions such as the YCSB(2) as seen in the graphs 702A and 702E respectively. However, for workloads characterized by a mix of read database transactions and write database transactions with a non-negligible number of accesses, for example, the YCSB (3) and the YCSB(4), the HTM-STE performs significantly better than the SILO even for a single thread 208 as seen in the graph 702I and 702M respectively. The sensitivity of the SILO to database transaction abort events may be seen in the graph 702F where all the evaluated database access algorithms manage to avoid contention except for the SILO which also presents the lowest bandwidth performance as seen in the graph 702E. The major advantage of the HTM_STE over the SILO is therefore with workloads characterized by both read-after-write database transactions which inflict the overhead penalty and a high database transaction abort rate as seen in the graph 702I.

The results of the HTM-STE are now analyzed compared to the 2PL algorithm. The 2PL algorithm with deadlock detection has comparable performance to the SILO for workloads characterized by read only database transactions or write only database transactions, for example, YCSB(1) and YCSB(2) as seen in graphs 702A and 702E respectively. This may also be seen for the TPC-C(3) and TPC-C(4) as seen in graphs 602I and 602M respectively. For workloads characterized by mixed read and write database transactions (accesses) the 2PL performance is significantly lower than the performance of the SILO, for example, for the TPC-C(1) and TPC-C(2) as seen in graphs 602A and 602E respectively due to the increased overhead due to the read-after-write. Therefore as the HTM_STE performs better than the SILO for these workloads, naturally the HTM_STE significantly outperforms the 2PL. Since the 2PL focuses on deadlock detection, i.e. avoid database transaction abort events thus investing minimum time in aborted database transactions, it may be of interest to compare the amount of time allocated to processing database transactions that eventually abort, i.e. the lost work for the HTM_STE compared to the 2PL. As may be seen for the TPC-C(1-4) workloads, the 2PL exhibits almost no database transaction abort events and hence significantly less database transaction abort events than the HTM-STE. The same is seen for the YCSB workloads characterized with read only or write only database transactions such as the YCSB(1) and YCSB(2) respectively. However, for workloads characterized by mixed read and write database transactions, for example, the YCSB(3), the 2PL exhibits significantly more database transactions abort events hence an increased aborted work (to process database transactions that eventually abort) than the HTM_STE. This is due to the pessimistic write transactions implemented by the HTM_STE which reduces the amount of lost work spent to process database transactions that eventually abort by detecting the conflicting transactions at an early stage (at transaction initiation).

The results of the HTM-STE are now analyzed compared to the HTM_TSO algorithm. Similarly to the HTM_STE, the HTM_TSO also cuts (chops) the database transaction to multiple HTM transactions. The main advantage of the HTM_STE over the HTM_TSO is in reducing the conflicts between HTM transactions through the use of the local (cached) database transactions information (cached Jca) and reducing the conflict window in which the concurrent HTM transactions may conflict with each other. This may allow read HTM transactions to be invisible to other HTM transactions in the HTM_STE as opposed to the HTM_TSO in which each HTM transaction reads and/or writes its version in a centralized record that is shared by all the HTM transactions. This may cause a bottleneck which may limit the performance and/or scaling of the HTM_TSO to a high number of threads 208. It is expected that for read only and write only workload scenarios with Z (theta)=0, for example, the YCSB(1) and YCSB(2), the HTM_STE and the HTM_TSO present substantially similar performance. This was demonstrated in the evaluation experiments as may be seen in graphs 702A and 702E respectively. Even though the HTM_STE and HTM_TSO are substantially similar, the HTM_STE presents slightly better bandwidth performance due to lower numbers of HTM transaction abort events as seen in graphs 702C and 702G which results in less fallback path executions as seen in graphs 702D and 702H. However, for workloads characterized by mixed read and write database transactions the HTM_STE performs significantly better than the HTM_TSO. This may apply to the TPC-C workloads, for example, the TPC-C(1) and TPC-C(2) as seen in graphs 602A and 602E. This may also apply to some of the YCSB workloads, for example, the YCSB(3) and YCSB(3) as evident in graphs 702I and 702M. This is due to the amount of aborted work invested to process database transaction that eventually abort due to the high contention which is significantly higher for the HTM-TSO compared to the HTM_STE as seen in the respective graphs 602B, 602F, 702J and 702N. For all the evaluated workloads, i.e. the TPC-C(1-4) and YCSB(1-4), the HTM_STE exhibits significantly less HTM transaction aborts due to contention compared to the HTM_TSO as seen in graphs 602C, 602G, 602K, 602O and 702C, 702G, 702K and 702O. However, the HTM_STE further mitigates the already reduced number of HTM transaction abort events by reducing the number of fallback path events followed as result of the HTM transaction abort events as seen in graphs 602D, 602H, 602L, 602P, 702D, 702H, 702L and 702P. This is achieved by reducing the conflicts between the HTM transactions as described herein above for the HTM_STE employing the process 100 and further reducing the probability for subsequent HTM transaction conflicts.

It is expected that during the life of a patent maturing from this application many relevant HTM technologies will be developed and the scope of the term HTM technologies, is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have disclosed all the possible subranges as well as individual numerical values within that range. For example, description of a range such as from 1 to 6 should be considered to have disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

What is claimed is:

1. A system for managing abort events of Hardware Transactional Memory (HTM) transactions to an in-memory database, comprising:
   a memory comprising instructions; and
   a processor coupled to the memory and executing the instructions, wherein the instructions cause the processor to:
      control a plurality of abort events of a plurality of database transactions held concurrently to a shared in-memory database, wherein each of the database transactions is split into a plurality of HTM transactions that are executed atomically to access a row of a plurality of rows of the in-memory database by:
         analyzing a metadata record associated with each of a plurality of potential abort events, wherein the metadata record comprises a row identification (ID) value and a row version value of a certain row of the rows, wherein the certain row is concurrently accessed by an aborting HTM transaction of the HTM transactions and another HTM transaction of the HTM transactions;
         comparing the row ID value to a local ID value of the aborting HTM transaction;
         comparing the row version value to a local version value of the aborting HTM transaction, wherein the local ID value uniquely identifies each of a plurality of threads that concurrently initiates each of the database transactions comprising an HTM transaction; and
         determining a contention condition between the aborting HTM transaction and the other HTM transaction.

2. The system of claim 1, wherein a size of each of the HTM transactions is adapted to fit in a single cache line of the processor.

3. The system of claim 1, wherein the metadata record comprises a type of the HTM transactions, and wherein the type is a member of a group consisting of a read HTM transaction and a write HTM transaction.

4. The system of claim 1, wherein the local version value is a self-incrementing value that is incremented by each of the threads following each successful commit of one of the database transactions, and wherein the row ID value and the row version value are of a first thread of the threads that made a most recent successful commit to the certain row.

5. The system of claim 4, wherein the local ID value and the local version value are respective local copies of a global ID value and a global version value based on the most recent successful commit to the certain row, wherein the global ID value and the global version value are stored in a shared record shared by the threads, and wherein each of the threads maintains a private copy of the local ID value and the local version value which are used exclusively by each of the threads.

6. The system of claim 5, wherein the instructions further cause the processor to update, by a respective one of the threads that initiates the HTM transaction, a respective local ID value and a respective local version value from the global ID value and the global version value, respectively, during a suspected contention.

7. The system of claim 1, wherein the instructions further cause the processor to increase a size of the metadata record to contain a larger ID value, and wherein the larger ID value supports an increased number of a plurality of the threads that concurrently initiate the database transactions.

8. The system of claim 1, wherein during a possible contention condition, the instructions further cause the processor to re-initiate the aborting HTM transaction until a retry threshold is exceeded, and wherein the retry threshold defines a predefined number of retries.

9. The system of claim 8, wherein the instructions further cause the processor to abort a respective database transaction after a number of initiation cycles of the other HTM transaction exceeds the retry threshold.

10. The system of to claim 8, wherein the instructions further cause the processor to not increase a count of re-initiating the aborting HTM transaction for an application instructed abort event.

11. The system of claim 1, wherein the instructions further cause the processor to apply a global lock to serialize accesses to the certain row for at least one of the aborting HTM transaction and the other HTM transaction.

12. A method of managing abort events of Hardware Transactional Memory (HTM) transactions to an in-memory database, comprising:
monitoring a plurality of potential abort events of a plurality of database transactions held concurrently to a shared in-memory database, wherein each of the database transactions is split to a plurality of HTM transactions that are executed atomically to access a row of a plurality of rows of the in-memory database;
analyzing a metadata record associated with each of the potential abort events, wherein the metadata record comprises a row identification (ID) value and a row version value of a certain row of the rows that is concurrently accessed by an aborting HTM transaction of the HTM transactions and another HTM transaction of the HTM transactions;
comparing the row ID value to a local ID value of the aborting HTM transaction;
comparing the row version value to a local version value of the aborting HTM transaction, wherein the local ID value uniquely identifies each of a plurality of threads that concurrently initiates each of the database transactions comprising an HTM transaction; and
determining a contention condition between the aborting HTM transaction and the other HTM transaction.

13. The method of claim 12, wherein the local ID value uniquely identifies each of the threads that are concurrently initiating the database transactions, wherein the local version value is a self-incrementing value that is incremented by each of the threads following each successful commit of one of the database transactions, wherein the row ID value is the ID value of a respective one of the threads that made a most recent successful commit to the certain row, and wherein the row version value is a version value of the respective thread at a time of the most recent successful commit.

14. The method of claim 13, wherein the local ID value and the local version value are respective local copies of a global ID value and a global version value based on the most recent successful commit to the certain row, wherein the global ID value and the global version value are stored in a shared record shared by the threads, and wherein each of the threads maintains a private copy of the local ID value and the local version value which are used exclusively by each of the threads.

15. The method of claim 14, further comprising updating, by a respective one of the threads that initiates the HTM transaction, a respective local ID value and a respective local version value from the global ID value and the global version value respectively during a suspected contention.

16. The method of claim 12, further comprising increasing a size of the metadata record to contain a larger ID value, wherein the larger ID value supports an increased number of the threads that concurrently initiate the database transactions.

17. The method of claim 12, wherein during a possible contention condition, the method further comprises re-initiating the aborting HTM transaction until a retry threshold is exceeded, and wherein the retry threshold defines a predefined number of retries.

18. The method of claim 17, further comprising aborting a respective database transaction after a number of initiation cycles of the other HTM transaction exceeds the retry threshold.

19. The method according to claim 17, further comprising not increasing a count of re-initiating the aborting HTM transaction for an application instructed abort event.

20. A computer readable storage medium, comprising computer readable program instructions stored thereon that when executed by a processor causes the processor to be configured to:
monitor a plurality of potential abort events of a plurality of database transactions held concurrently to a shared in-memory database, wherein each of the database transactions is split to a plurality of HTM transactions that are executed atomically to access a row of a plurality of rows of the shared in-memory database;
analyze a metadata record associated with each of the potential abort events, wherein the metadata record comprises a row identification (ID) value and a row version value of a certain row of the rows that is concurrently accessed by an aborting HTM transaction of the HTM transactions and another HTM transaction of the HTM transactions;
compare the row ID value to a local ID value of the aborting HTM transaction;
compare the row version value to a local version value of the aborting HTM transaction, wherein the local ID value uniquely identifies each of a plurality of threads that concurrently initiates each of the database transactions comprising an HTM transaction; and determine a contention condition between the aborting HTM transaction and the other HTM transaction.

\* \* \* \* \*